(12) United States Patent
Kim et al.

(10) Patent No.: US 7,756,334 B2
(45) Date of Patent: Jul. 13, 2010

(54) METHOD, MEDIUM, AND APPARATUS FOR PERSON-BASED PHOTO CLUSTERING IN DIGITAL PHOTO ALBUM, AND PERSON-BASED DIGITAL PHOTO ALBUMING METHOD, MEDIUM, AND APPARATUS

(75) Inventors: Sangkyun Kim, Yongin-si (KR); Jiyeun Kim, Seoul (KR); Youngsu Moon, Seoul (KR); Yongman Ro, Daejeon-si (KR); Seungji Yang, Wonju-si (KR)

(73) Assignees: Samsung Electronics Co., Ltd., Suwon-Si (KR); Research & Industrial Cooperation Group, Daejeon-Si (KR)

( * ) Notice: Subject to any disclaimer, the term of this patent is extended or adjusted under 35 U.S.C. 154(b) by 1126 days.

(21) Appl. No.: 11/247,203

(22) Filed: Oct. 12, 2005

(65) Prior Publication Data

US 2006/0078201 A1    Apr. 13, 2006

Related U.S. Application Data

(60) Provisional application No. 60/617,086, filed on Oct. 12, 2004.

(30) Foreign Application Priority Data

Jun. 7, 2005    (KR) .................. 10-2005-0048399

(51) Int. Cl.
*G06K 9/00*    (2006.01)
(52) U.S. Cl. ............... 382/181; 382/255; 707/E17.023; 707/E17.031
(58) Field of Classification Search ................ 382/181, 382/255; 707/E17.023, E17.031
See application file for complete search history.

(56) References Cited

U.S. PATENT DOCUMENTS

| | | | | |
|---|---|---|---|---|
| 5,576,759 A | * | 11/1996 | Kawamura et al. | 348/207.99 |
| 5,751,286 A | * | 5/1998 | Barber et al. | 715/835 |
| 5,761,655 A | * | 6/1998 | Hoffman | 707/4 |
| 7,218,759 B1 | * | 5/2007 | Ho et al. | 382/118 |

FOREIGN PATENT DOCUMENTS

EP    1004967    5/2000

OTHER PUBLICATIONS

Das M. et al., "Automatic Face-based Image Grouping for Albuming", 2003 IEEE International Conference on Systems, Man and Cybernetics. SMC'03. Conference Processings. Washington DC, Oct. 5-8, 2003; [IEEE International Conference on Systems, Man, and Cybernetics], New York, NY: IEEE, US, vol. 4, Oct. 5, 2003, pp. 3726-3731.

Davis M. et al., "From Context to Content: Leveraging Context to Infer Media Metadata", ACM Multimedia, Proceedings of the International Conference, New York, NY, US, Oct. 10, 2004, pp. 188-195.

Extended European Search Report mailed Sep. 18, 2008 issued with respect to the corresponding European Patent Application No. 05856532.6.

* cited by examiner

*Primary Examiner*—Bhavesh M Mehta
*Assistant Examiner*—Stephen R Koziol
(74) *Attorney, Agent, or Firm*—Staas & Halsey LLP

(57) ABSTRACT

A person-based digital photo clustering method, medium, and apparatus and a person-based digital photo albuming method, medium, and apparatus. The clustering method may include detecting a face area from photo data, extracting predetermined content-based face feature value information from the detected face area, obtaining person-based photo clustering hint information, and performing person-based clustering by applying photo clustering hint information to the extracted content-based face feature value information. The person-based digital photo albuming method may include generating photo description information for identifying at least a photo, generating albuming tool description information supporting person-based photo clustering and including at least a parameter for person-based photo clustering, performing photo albuming including person-based clustering by using at least photo description information and albuming tool description information, generating predetermined photo group description information from photo albumed data, and generating predetermined photo album information by using photo description information and photo group description information.

58 Claims, 15 Drawing Sheets

FIG. 17

|  | Me | Dad | Mom | Tom | Nick | John | Mike | Patty | School mate |
|---|---|---|---|---|---|---|---|---|---|
| Me | X | | | | | | | | |
| Dad | 0.1 | X | | | | | | | |
| Mom | 0.3 | 0.7 | X | | | | | | |
| Tom | 0.6 | 0.3 | 0.3 | X | | | | | |
| Nick | 0.3 | 0.6 | 0.5 | 0.0 | X | | | | |
| John | 0.9 | 0.8 | 0.3 | 0.7 | 0.0 | X | | | |
| Mike | 0.2 | 0.0 | 0.0 | 0.9 | 0.8 | 0.3 | X | | |
| Patty | 0.5 | 0.0 | 0.0 | 0.3 | 0.4 | 0.1 | 0.4 | X | |
| School mate | 0.7 | 0.0 | 0.0 | 0.1 | 0.1 | 0.1 | 0.1 | 0.1 | X |

METHOD, MEDIUM, AND APPARATUS FOR PERSON-BASED PHOTO CLUSTERING IN DIGITAL PHOTO ALBUM, AND PERSON-BASED DIGITAL PHOTO ALBUMING METHOD, MEDIUM, AND APPARATUS

CROSS-REFERENCE TO RELATED APPLICATIONS

This application claims the benefit of U.S. Provisional Application No. 60/617,086, filed on Oct. 12, 2004 in the U.S.P.T.O., and Korean Patent Application No. 10-2005-0048399, filed on Jun. 7, 2005, in the Korean Intellectual Property Office, the disclosures of which are incorporated herein in their entirety by reference.

BACKGROUND OF THE INVENTION

1. Field of the Invention

Embodiments of the present invention relate to a digital photo album, and more particularly, to a method, medium, and apparatus for person-based photo clustering, and a person-based digital photo albuming method, medium, and apparatus.

2. Description of the Related Art

Recently, demands for digital cameras have been increasing more and more. In particular, with the recent development of memory technologies, highly integrated ultra-small-sized memory devices are now widely used. Further, with the development of digital image compression technologies that do not compromise picture quality, users can now store hundreds to thousands of photos in one memory device. As a result, many users now need apparatuses and tools to more effectively manage many photos. Accordingly, demands by users for an efficient digital photo album are increasing.

Generally, a digital photo album can be used to transfer photos taken by a user from a digital camera or a memory card to a local storage apparatus of the user and to manage the photos conveniently in a computer. Users may cluster and index many photos in a time series, by person, or even by specific category, using the photo album. A correspondingly constructed photo album enables the users to easily browse photo data or share photos with other users later.

In "Requirement For Photoware" (ACM CSCW, 2002), David Frohlich investigated the photo album preferred capabilities desired by users through a survey of many users. Most interviewees agreed with the necessity of a digital photo album, but felt that the time and effort necessary to group or label many photos, one by one, was inconvenient, and expressed difficulties in sharing photos with others.

So far, there have been quite a bit of research suggesting differing methods of clustering photo data. Basically, those methods include clustering photos according to the photographed time, and methods of clustering photos based on contents-based feature information. As further developments, research on methods of clustering photos based on events of the photos, and methods of clustering photos based on the actual people in the photos, have been carried out.

Among these methods, one of the methods that users most frequently use is clustering of photo data by person, i.e., clustering based on the people in the photo. Automatic clustering of a large volume of photo data in relation to persons taken in the photos allows users to easily share photo data with others or easily browse photo data later.

The most important technology in the process of clustering photo data by person is by use of face recognition technology.

Face recognition can be explained as a process of building a facial database containing facial data of different faces of different people, and then, comparing an input facial image with facial image data stored in the already built database to determine who the input facial image belongs to.

That is, in this process, a facial image can be detected within photo data and, by comparing the facial image with facial image data stored in the database, the input facial image can be recognized. For this, a process almost identical to that of performing pattern recognition in an image processing method is performed, with such a method including image acquisition, pre-processing, face extraction, and face recognition.

A lot of research has been performed on methods for detecting and/or recognizing a face in an image. The face recognition field has primarily been developed centered on security systems. For example, research has mainly been performed on face extraction and recognition for a automated intelligent monitoring system, an entrance control system, and a criminal suspects retrieval system. In these applications, the research has focused on a facial recognition method that is robust against external lighting, facial expression and pose of a face in which the face of a person can be more accurately extracted.

Unlike this, corresponding research on recognizing a face in photo data is in its fledgling stage. The process of extracting or recognizing a face in photo data is much more difficult than that of extracting or recognizing a face in an image obtained by a security system. Since the security system obtains image data by using a camera fixedly installed in a fixed space, a facial image extracted from an image has a relatively typical background. On the other hand, since photo data includes images taken by a user at different places, backgrounds in corresponding photos are diverse, frequently changing. In addition, as a camera may be used in different manners (e.g., though use of a zoom function or a flash), or the direction of a camera when a photo is taken may change, a variety of backgrounds can be shown in an identical space, and changes of external lighting or illumination are much greater.

Due to the reasons described above, in a method of clustering photo data by person, if only facial images are used, as in the conventional security system, the method results in very low level performance. In order to soundly cluster photo data by person, a method and system using a variety of additional information items that can be obtained from photos, in addition to facial image information extracted from photos, thus, are required.

As leading research to solve this problem, the following is representative of such research. In "Face Recognition-Matching System Effective to Images Obtained in Different Imaging Conditions" (U.S. Pat. No. 6,345,109 B1), a system capable of recognizing a facial image having serious noise, with a front facial image having relatively smaller interference from lighting, is suggested. However, this system has a problem that a user must prepare facial images having less noise in advance.

In "Automatic Cataloging of People in Digital Photographs" (U.S. Pat. No. 6,606,398 B2), identification parameters related to individual facial images stored in a database are defined and these are then used for face-based photo clustering. As identification parameters, there are names, relations, sexes, ages, and so on. A newly input image is found in the database by using an identification parameter input by the user, and then clustered. However, since the user must directly input the identification parameter, a great amount of time is required for inputting the identification parameters, and therefore this method cannot be practically used.

In "Automatic Face-based Image Grouping for Albuming" (IEEE, 2003), suggested is a method by which the age and sex of each face are automatically detected, and by using these, a group of photos are face-based clustered. This method has an advantage that age and sex information of a person, as well as facial information of a photo, are used, but if a variety of additional information items of a photo are used together, more effective photo grouping can be performed.

That is, an appropriate combination of a variety of additional information items that can be obtained from photo data and consideration of elements that can occur in a photo image, such as external lighting change, pose change, facial expression change, and time change, are needed. If features of photos, for example, the feature of photo data being taken in shorter time intervals, similarities between backgrounds and similarities between people may be considered, along with similarities between worn clothes, the performance of person-based photo clustering may be greatly improved over that of photo clustering using only facial information, as will be discussed in greater detail below.

SUMMARY OF THE INVENTION

Embodiments of the present invention provide a method, medium, and apparatus for person-based digital photo clustering.

In addition, embodiments of the present invention also provide person-based digital photo albuming method, medium, apparatus.

To achieve the above an/or other aspects and advantages, embodiments of the present invention include a person-based digital photo clustering method, including detecting a face area from photo data, extracting predetermined content-based face feature value information from the detected face area, obtaining predetermined person-based photo clustering hint information, and performing person-based clustering by applying the photo clustering hint information to the extracted content-based face feature value information.

The detecting of the face area further may further include normalizing a size of the face area by using detected face area information, to generate a normalized face area, and in the extracting of the predetermined content-based face feature value information, predetermined content-based face feature value information may be extracted from the normalized face area.

In the extracting of the predetermined content-based face feature value information from the normalized face area, the predetermined content-based feature value information may include an item expressing color, texture, and/or shape feature values extracted by using a visual descriptor of a moving picture experts group (MPEG)-7, and/or an item expressing an audio feature value extracted by using an audio descriptor of the MPEG-7.

In the obtaining of the predetermined person-based photo clustering hint information, the person-based clustering hint information may include at least one of a personal appearance hint indicating appearance feature information of a person, a situation hint indicating information on a result of clustering based on situation information including a place or background of a photo, a camera hint indicating camera information, photographing information, and/or photo information included in a photo file, and an audio hint indicating audio information of a user stored together with the photo file.

The personal appearance hint may include at least one of clothes information, skin tone information, and hair style information of the person. In addition, the situation hint may include a situation ID expressing an identifier of a situation to which the photo belongs. The camera hint may include at least one of a taken time expressing information on a time when the photo was taken, a focal length expressing information on a focal length when the photo was taken, an exposure time expressing information on an exposure time when the photo was taken, a zoom info expressing information on a camera zoom when the photo was taken, a flash info expressing information on a flash when the photo was taken, and a GPS info expressing global positioning system (GPS) information when the photo was taken. The audio hint may include a speech info expressing speech information extracted from audio information stored together with photo data and recognized keyword information.

The performing of person-based clustering may include performing clustering based on a situation in which a photo is taken, by applying the photo clustering hint information to the extracted content-based face feature value information, to generate a situation-based cluster, and performing person-based clustering in the situation-based cluster, by applying the photo clustering hint information to the extracted content-based person feature value information.

The method may further include indexing each of multiple person-based clusters if person-based clustering is finished. Here, in the indexing of each of the multiple person-based clusters, a person-based cluster may be compared with predetermined indexed personal photos stored in a database and stored according to a closest corresponding index.

The predetermined indexed personal photos stored in the database may have respective person information, and the person information may be formed with person list information including at least one of an identifier of the person, the name of the person, importance of the person, relations of the person with other people in a group of the person, and information on a higher-level group to which the person belongs.

The predetermined indexed personal photos stored in the database may further include information on the group to which the person belong, and the information of the person is formed with person group list information including at least one of an identifier of the group, the name of the group, importance of the group, relations of the group with other person groups, and information on a higher-level group to which the group belongs.

To achieve the above an/or other aspects and advantages, embodiments of the present invention include a person-based digital photo clustering apparatus including a face area detection unit to detect a face area from photo data, a face feature value extraction unit to extract predetermined content-based face feature value information from the detected face area, a clustering hint information obtaining unit to obtain predetermined person-based photo clustering hint information, and a clustering unit to perform person-based clustering by applying the photo clustering hint information to the extracted content-based face feature value information.

The apparatus may further include a face area normalization unit to normalize a size of the face area by using detected face area information to generate a normalized face area, wherein the face feature value extraction unit extracts predetermined content-based face feature value information from the normalized face area.

The predetermined content-based feature value information of the face feature value extraction unit may include an item expressing color, texture, and/or shape feature values extracted by using a visual descriptor of an MPEG-7, and/or an item expressing an audio feature value extracted by using an audio descriptor of the MPEG-7.

Further, the clustering hint information obtaining unit may include at least one of a personal appearance hint extraction unit extracting a personal appearance hint indicating appearance feature information of a person, a situation hint extraction unit extracting a situation hint indicating information on a result of clustering based on situation information including a place or background of a photo, a camera hint extraction unit extracting a camera hint indicating camera information, photographing information, and/or photo information included in a photo file, and an audio hint extraction unit extracting an audio hint indicating audio information of a user stored together with the photo file.

The clustering unit may include a situation-based clustering unit to perform clustering based on a situation in which a photo is taken, by applying the photo clustering hint information to the extracted content-based face feature value information, to generate a situation-based cluster, and a person-based clustering unit to perform person-based clustering in the situation-based cluster, by applying the photo clustering hint information to the extracted content-based person feature value information.

The apparatus may include a person-based indexing unit to index each of multiple person-based clusters if person-based clustering is finished.

Here, the apparatus may further include a group preference hint obtaining unit to obtain a group preference value, wherein by referring to the group preference value obtained by the group preference hint obtaining unit, the person-based indexing unit compares a person-based cluster with predetermined indexed personal photos stored in a database and stored according to a closest corresponding index.

The predetermined indexed personal photos stored in the database may have respective person information, and information on a group to which other people and the person belong, and the person information may be formed with person list information comprising at least one of an identifier of the person, the name of the person, importance of the person, relations of the person with other people, and information on a higher-level group to which the person belongs, and the person group information is formed with person group list information comprising at least one of an identifier of the group, the name of the group, importance of the group, relations of the group with other groups, and information on a higher-level group to which the group belongs.

To achieve the above an/or other aspects and advantages, embodiments of the present invention include a person-based digital photo albuming method, including generating photo description information including a photo identifier for identifying at least a photo, generating albuming tool description information supporting person-based photo clustering and including at least a parameter for person-based photo clustering, performing photo albuming including the person-based clustering by using at least the photo description information and albuming tool description information, generating predetermined photo group description information from photo albumed data from the performing of the photo albuming, and generating predetermined photo album information by using the photo description information and the predetermined photo group description information.

The method may further include receiving an input of photo data from an internal memory device of a digital camera or a portable memory device.

In the generating of the photo description information, existence of EXIF information, such as camera information and photographing information, may be confirmed in a photo file of an input photo, and if the EXIF information exists in the photo file, the EXIF information may be extracted and expressed according to a predetermined photo description scheme.

The photo description information may include at least a photo identifier, information on a photographer having taken the photo, photo file information, camera information, photographing information and a content-based feature value, with the content-based feature value including a visual descriptor generated by using pixel information of the photo, including color, texture, and/or shape feature values, and/or an audio descriptor including a speech feature value.

In addition, in the generating of the albuming tool description information, the parameter for person-based photo clustering may include a person-based group list item describing an indexed person-based group list, and a person-based clustering hint item for improvement of performance of person-based clustering.

The person-based group list item may include group list information indicating a list of groups after person-based clustering and indexing are performed, and person list information indicating a list of persons after person-based clustering and indexing are performed.

Individual group information on each of multiple groups forming the group list information may include at least one of an identifier of a group, a name of the group, importance of the group, relationships of the group, and an identifier of a higher-level group to which the group belongs. The importance of the group may be determined by a frequency that a user watches photos included in the group or people in the group.

Individual person information forming the person list information may include at least one of an identifier of the person, a name of the person, relationships of the person with other people, an importance of the person, and an identifier of an upper-level group to which the person belongs. The importance of the person may be determined by a frequency that the user watches photos including the person.

The person-based clustering hint item may include at least one of a personal appearance hint indicating appearance feature information of a person, a situation hint indicating information on a result of situation-clustering based on situation information including a place or background of the photo, a camera hint indicating camera information, photographing information, and/or photo information included in a photo file, a group preference hint indicating information on a group list, selected by the user, which photos to be clustered belong, and an audio hint indicating audio information of a user stored together with the photo file.

The situation hint may include an identifier of a situation to which the photo belongs as the result of the situation-based clustering of the photo. The personal appearance hint may include at least one of information on clothes worn by the person, skin tone information of the person, and hair style information of the person. The camera hint may include at least one of information on a time when the photo was taken, information on a focal length when the photo was taken, information on an exposure time when the photo was taken, information on a camera zoom when the photo was taken, information on a flash when the photo was taken, and GPS information when the photo was taken. The group preference hint may include a group preference value numerically expressing groups selected by the user and a degrees of importance of the groups. Further, the audio hint may include a speech info expressing speech information extracted from audio information stored together with the photo file and recognized keyword information.

The performing of the photo albuming including person-based clustering may include person-based clustering of digital photo data.

Here, the person-based photo clustering may include detecting a face area from photo data, extracting predetermined content-based face feature value information from the detected face area, obtaining predetermined person-based photo clustering hint information, and performing person-based clustering by applying the photo clustering hint information to the extracted content-based face feature value information.

The person-based photo clustering may further include normalizing a size of the face area by using information of the detected face area, to generate a normalized face area, and in the extracting of the content-based face feature value information, predetermined content-based face feature value information is extracted from the normalized face area.

The method may further include indexing each of multiple person-based clusters if person-based clustering is finished.

Here, in the indexing of each of the multiple person-based clusters, a person-based cluster may be compared with predetermined indexed personal photos stored in a database and is stored with according to a closest corresponding index.

The predetermined indexed personal photos stored in the database may have respective person information, and the person information may be formed with person list information including at least one of an identifier of the person, a name of the person, importance of the person, relations of the person with other people, and information on a higher-level group to which the person belongs.

The predetermined indexed personal photos stored in the database may further include information on a group to which the person and the other people belong, and the person group information may be formed with person group list information including at least one of an identifier of the group, the name of the group, importance of the group, relationship of the group with other groups, and information on a higher-level group to which the group belongs.

To achieve the above an/or other aspects and advantages, embodiments of the present invention include a person-based digital photo albuming apparatus, including a photo description information generation unit to generate photo description information including a photo identifier for identifying at least a photo, an albuming tool description information generation unit to generate albuming tool description information supporting person-based photo clustering and including at least a parameter for person-based photo clustering, an albuming tool to perform photo albuming including the person-based clustering by using at least the photo description information and the albuming tool description information, photo group information generation unit to generate predetermined photo group description information based on an output of the albuming tool, and photo album information generation unit to generate predetermined photo album information by using the photo description information and the predetermined photo group description information.

The apparatus may further include a photo input unit to receive an input of photo data from an internal memory device of a digital camera or a portable memory device.

The photo description information generation unit may confirms an existence of EXIF information, such as camera information and photographing information, in a photo file of an input photo, and if the EXIF information exists in the photo file, extracts the EXIF information and expresses according to a predetermined photo description scheme.

The photo description information may include at least a photo identifier, information on a photographer having taken the photo, photo file information, camera information, photographing information and a content-based feature value, with the content-based feature value potentially including a visual descriptor generated by using pixel information of the photo, and including color, texture, and/or shape feature values, and/or an audio descriptor including a speech feature value.

The parameter for person-based photo clustering of the albuming tool description information generation unit may include a person-based group list item describing an indexed person-based group list, and a person-based clustering hint item for improvement of the performance of person-based clustering.

The person-based group list item may include group list information indicating a list of groups after person-based clustering and indexing are performed, and person list information indicating a list of persons after person-based clustering and indexing are performed.

Individual group information on each of multiple groups forming the group list information may include at least one of an identifier of a group, a name of the group, importance of the group, relationships of the group, and an identifier of a higher-level group to which the group belongs.

Individual person information forming the person list information may include at least one of an identifier of the person, a name of the person, relationships of the person with other people, an importance of the person, and an identifier of an upper-level group to which the person belongs.

Further, the person-based clustering hint item may include at least one of a personal appearance hint indicating appearance feature information of a person, a situation hint indicating information on a result of situation-clustering based on situation information including a place or background of the photo, a camera hint indicating camera information, photographing information, and/or photo information included in a photo file, a group preference hint indicating information on a group list, selected by the user, which photos to be clustered belong, and an audio hint indicating audio information of a user stored together with the photo file.

The albuming tool may include a person-based photo clustering tool performing person-based clustering of digital photo data.

Here, the person-based photo clustering tool may include a face area detection unit to detect a face area from photo data, a face feature value extraction unit to extract predetermined content-based face feature value information from the detected face area, a clustering hint information obtaining unit to obtain predetermined person-based photo clustering hint information, and a clustering unit to perform person-based clustering by applying the photo clustering hint information to the extracted content-based face feature value information.

The person-based photo clustering tool may further include a face area normalizing unit to normalize a size of the detected face area by using information of the detected face area, to generate a normalized face area, and the face feature value extraction unit to extract predetermined content-based face feature value information from the normalized face area.

In addition, the apparatus may include a person-based indexing unit to index each of multiple person-based clusters if person-based clustering is finished. The person-based indexing unit may further include a group preference hint obtaining unit to obtain a group preference value, and by referring to the group preference value, obtained by the group preference hint obtaining unit, the person-based indexing unit may compare a person-based cluster with predetermined indexed personal photos stored in a database and is stored according to a closest corresponding index.

The predetermined indexed personal photos stored in the database may have respective person information, and information on a group to which the person and other people belong, and the person information may be formed with person list information comprising at least one of an identifier of the person, a name of the person, importance of the person, relationships of the person with the other people, and information on a higher-level group to which the person belongs, and the person group information may be formed with person group list information comprising at least one of an identifier of the group, a name of the group, importance of the group, relationships of the group with other groups, and information on a higher-level group to which the group belongs.

To achieve the above an/or other aspects and advantages, embodiments of the present invention include a medium including computer readable code to implement embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings, in which:

FIG. 17 illustrates an embodiment of relations among persons expressed in a table.

DETAILED DESCRIPTION OF THE PREFERRED EMBODIMENTS

Figure 1:
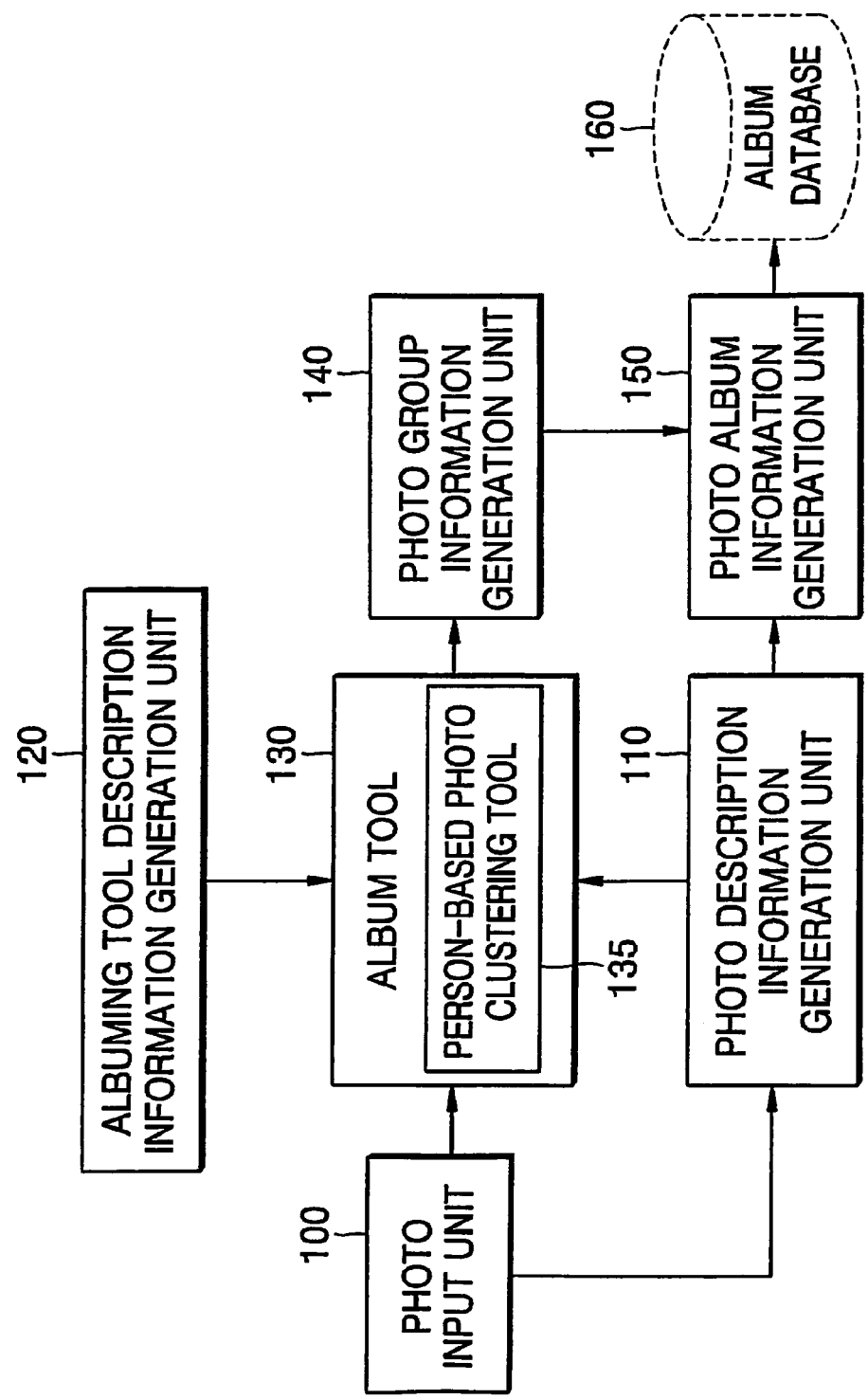
FIG. 1 is a block diagram of a person-based digital photo albuming apparatus, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Referring to FIG. 1, a person-based digital photo albuming apparatus, according to an embodiment of the present invention, may include a photo description information generation unit 110, an albuming tool description information generation unit 120, an albuming tool 130, a photo group information generation unit 140, and a photo albuming information generation unit 150. The apparatus may further include a photo input unit 100.

The photo input unit 100 may receive photo data, e.g., a series of photos, from an internal memory apparatus of a digital camera or a portable memory apparatus, for example.

The photo description information generation unit 110 may generate photo description information describing a photo and including at least a photo descriptor.

More specifically, the photo description information generation unit 110 can confirm from each input photo whether or not there is EXIF information, such as camera information and photographing information, stored in a photo file, and if the information is in the photo file, the information may be extracted and expressed according to a photo description scheme. At the same time, content-based feature values may be extracted from the pixel information of the photo and expressed according to the photo description scheme. The photo description information may be input to the photo albuming tool 130 for grouping photos.

The albuming tool description information generation unit 120 may generate albuming tool description information, including predetermined parameters, for more efficiently clustering and indexing photos by using the variety of generated photo description information items.

The albuming tool 130 may perform photo albuming, including person-based clustering, by using at least the photo description information and the albuming tool description information, and may include a person-based photo clustering tool 135 clustering digital photo data based on individual people. The person-based photo clustering tool 135 is a person-based digital photo clustering apparatus which clusters digital photo data based on individual people.

Figure 2:
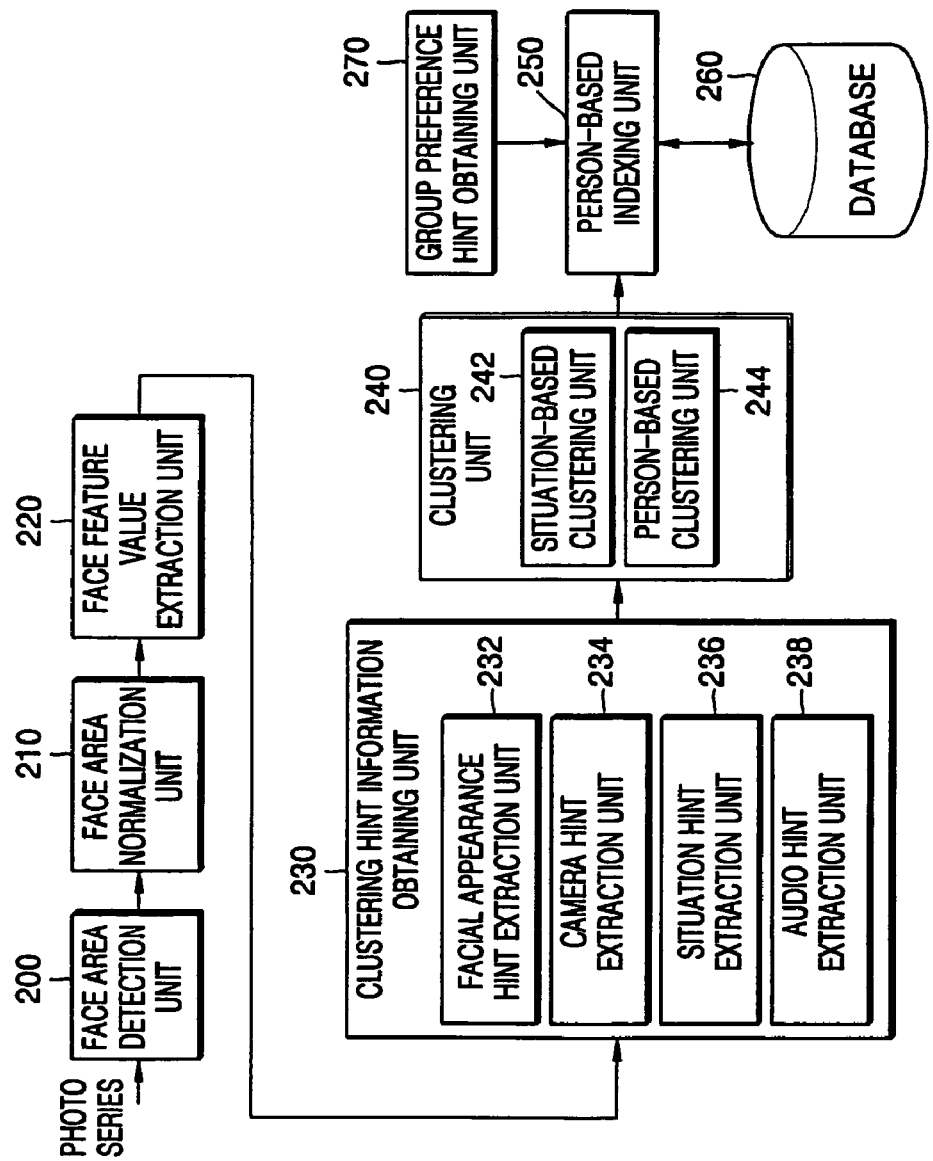
FIG. 2 is a block diagram of a person-based photo clustering tool, according to an embodiment of the present invention.

As shown in FIG. 2, the person-based photo clustering tool 135 may be formed with a face area detection unit 200, a face feature value extraction unit 220, a clustering hint information obtaining unit 230, and a person-based clustering unit

240. Also, the person-based clustering tool 135 may further include a face area normalization unit 210. It may also be preferable for the person-based clustering tool 135 to further include a person-based indexing unit 250.

The face area detection unit 200 may detect a face area from photo data.

The face area normalization unit 210 may normalize the size of the face area by using the detected face area information.

The face feature value extraction unit 200 may extract predetermined content-based face feature value information from the normalized face area.

The clustering hint information obtaining unit 230 may obtain predetermined person-based photo clustering hint information, and include at least one of a personal appearance hint extracted unit 232, a camera hint extraction unit 234, a situation hint extraction unit 236, and an audio hint extraction unit 238.

The personal appearance hint extraction unit 232 may extract a personal appearance hint indicating appearance feature information of a person. The camera hint extraction unit 234 may extract a camera hint indicating camera information, photographing information, and photo information included in a photo file. The situation hint extraction unit 236 may extract a situation hint indicating information on the result clustered based on situation information, such as the place where a photo was taken, or the background. The audio hint extraction unit 238 may extract an audio hint indicating audio information of a user, stored together with a photo file.

The person-based clustering unit 240 may perform person-based clustering by applying the photo clustering hint information to the extracted content-based face feature value information.

The person-based indexing unit 250 may compare the person-based photo cluster with predetermined personal photos stored in a database 260, and store as a closest index. Each of the predetermined indexed personal photos stored in the database 260 can have an individual person's information and information on a group to which the person belongs. The individual person information can be formed with person list information, including at least one of the identifier (ID) of the person, the name of the person, importance of the person, relations with other people, and information on a higher-level group to which the person belongs. The person group information may be formed with person group list information including at least one of the ID of the person group, the name of the person group, importance of the person group, relations of the person group with other person's groups, and information on a higher-level group to which the person group belongs. When a person-based photo cluster is compared with predetermined indexed personal photos stored in the database 260, in the person-based indexing unit 250, a group preference value from the outside can be received by a group preference hint obtaining unit 270 and the comparison can be performed with reference to this value.

If the indexing in the person-based indexing unit 250 is finished, a database updating unit 280 can update indexed photos of the database 280 by using the indexed photos.

The photo group information generation unit 140 can generate predetermined photo group description information from the output of the albuming tool 130. The photo albuming information generation unit 150 may then generate predetermined photo albuming information by using the photo description information and the photo group description information.

Figure 3:
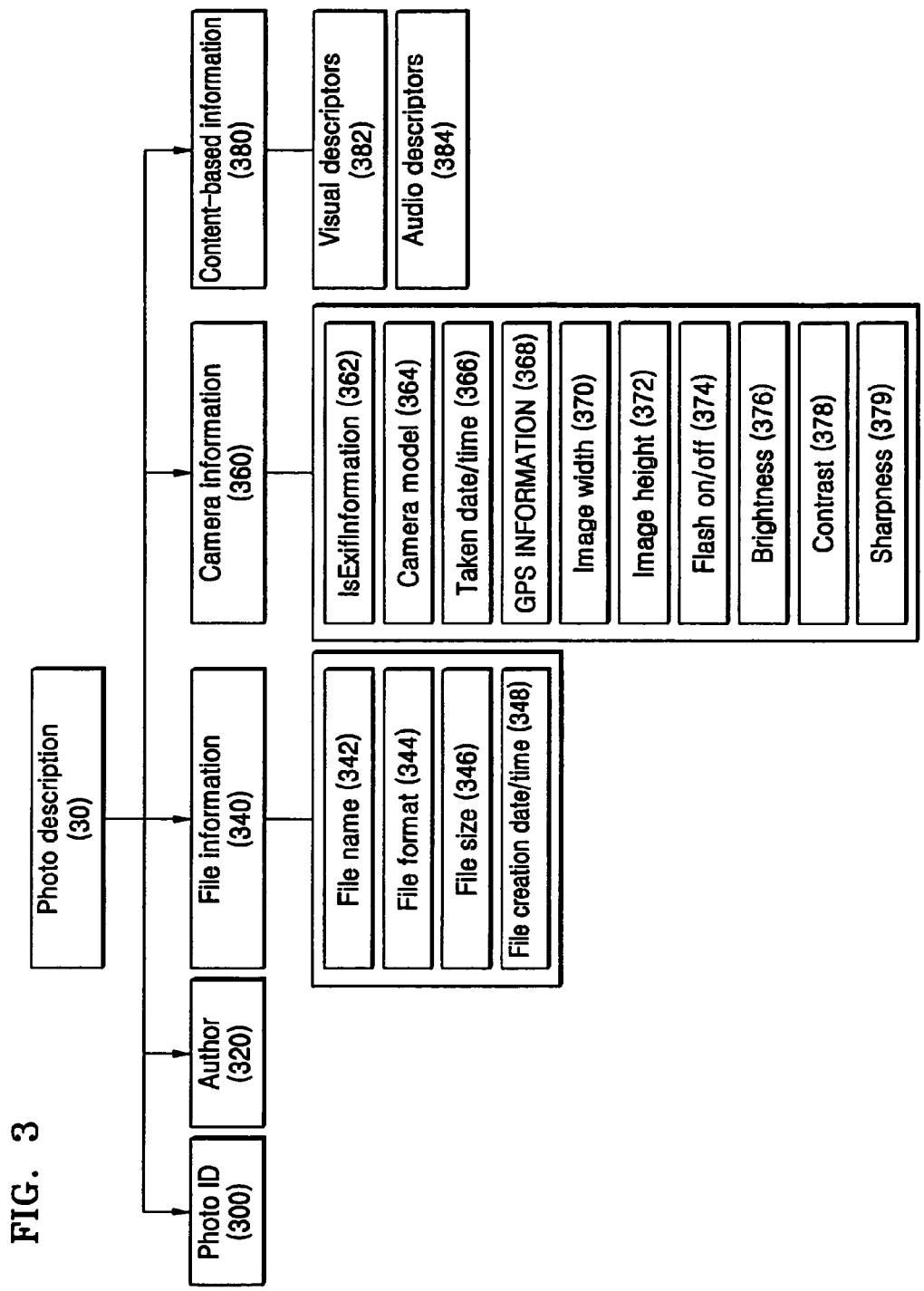
FIG. 3 illustrates a structural diagram of photo description information generated in a photo description information generation unit, according to an embodiment of the present invention.

FIG. 3 illustrates a structural diagram of photo description information generated in the photo description information generation unit 110. From photos input from an internal memory apparatus of a digital camera or a portable memory apparatus, for example, the photo description information can express camera information and photographing information stored in a file and content-based feature value information extracted from the contents of photos. As shown in FIG. 3, the photo information description information 30 may include a photo identifier (Photo ID) 300 identifying each photo, an item (Author) 320 expressing the author having taken the photo, an item (File information) 340 expressing file information stored in the photo file, an item (Camera information) 360 expressing camera information stored in the photo file, and an item (Content-based information) 380 expressing a content-based feature value.

As detailed items to express the file information 340 stored in the photo file, the photo information description information 30 may also include an item (File name) 342 expressing the name of the photo file, an item (File format) 344 expressing the format of the photo file, an item (File size) 346 expressing the capacity of the photo file and an item (File creation date/time) 348 expressing the date and time when the photo file was created.

As detailed items to express the camera and photographing information 360, stored in the photo file, the photo information description information 30 may also include an item (IsEXIFInformation) 362 expressing whether or not the photo file includes EXIF information, an item (Camera model) 364 expressing the camera model having taken the photo, an item (Taken date/time) 366 expressing the date and time when the photo was taken, an item (GPS information) 368 accurately expressing the location information of the place where the photo was taken, with information obtained by a global positioning system (GPS), an item (Image width) 370 expressing the width information in the size of the photo, an item (Image height) 372 expressing the height information in the size of the photo, an item (Flash on/off) 374 expressing whether or not a camera flash was used to take the photo, an item (Brightness) 376 expressing the brightness information of the photo, an item (Contrast) 378 expressing the contrast information of the photo, and an item (Sharpness) 379 expressing the sharpness information of the photo.

Also, the information 380 expressing a content-based feature value extracted from a photo may include an item (Visual descriptor) 382 expressing feature values of color, texture, and shape extracted by using MPEG-7 Visual Descriptor, and an item (Audio descriptor) 384 expressing a feature value of voice extracted by using MPEG-7 Audio Descriptor.

Figure 4:
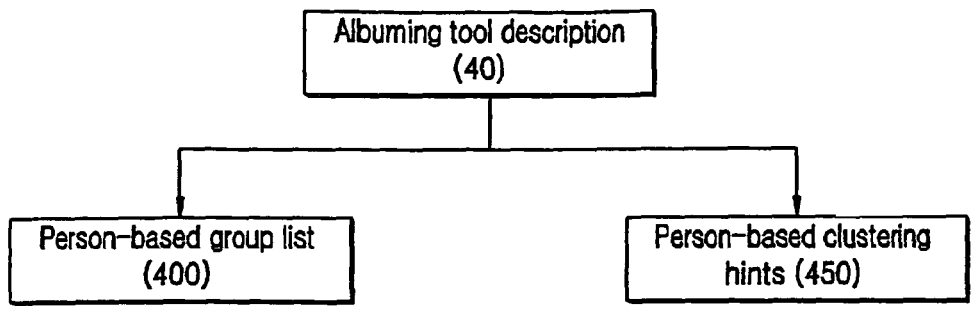
FIG. 4 illustrates a description scheme expressing parameters for person-based photo clustering in a process for person-based photo clustering, e.g., by using the photo information described in FIG. 3, according to an embodiment of the present invention.

FIG. 4 illustrates a description scheme expressing parameters for person-based photo clustering in a process for person-based photo clustering by using the photo information, e.g., as described in FIG. 3. Referring to FIG. 4, parameters 40 for photo clustering by person may include an item (person-based group list) 400 describing an already indexed person-based group list, and person-based clustering hints 450.

Figure 5:
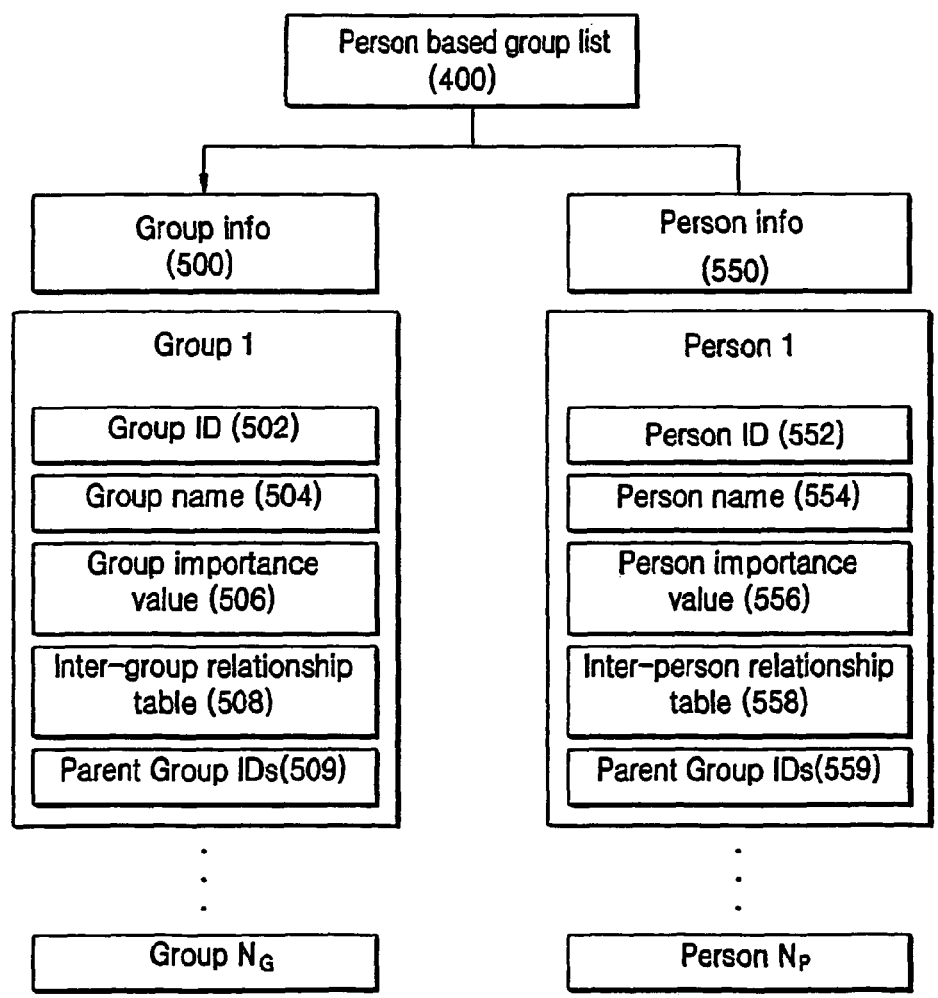
FIG. 5 is a block diagram showing a description scheme expressing an item (person-based group list) describing a person-based group list among parameters for person-based photo clustering, e.g., as described in FIG. 4, according to an embodiment of the present invention.

FIG. 5 is a block diagram showing a description scheme expressing an item (person-based group list) 400 describing a person-based group list among parameters for person-based photo clustering, e.g., as described in FIG. 4.

Referring to FIG. 5, the item 400 describing a person-based group list may be an item to express lists of groups and persons stored after photos are person-based clustered and indexed. The item 400 may be formed with a group information item (Group info) 500 and a person information item (Person info) 550.

The group information item 500 may be an item expressing group information of plurality of persons, and can include information of one or more groups. The group information item 500 may include an item (Group ID) 502, expressing a unique ID of a group, an item (Group name) 504, expressing a unique name of the group, an item (Group importance value) 506, expressing the degree of importance of the group, an item (Inter-group relationship table) 508, expressing the relationship with other groups in the form of a table, and an item (Parent group IDs) 509, expressing information on a parent group (a higher-level group) to which the group belongs, with an ID. Here, the item 506, expressing the degree of importance of the group, can be automatically measured by using information recording how frequently the user watches photos of the group or persons belonging to the group, or can be set with an arbitrary value directly by the user, for example. Methods for determining the degree of importance of a group include the above examples, but are not limited to the same.

The item 508, expressing the relationship with other groups, in the form of a table, is an item expressing the relationship of two groups, storing the frequency of photos in which people in the group and a person in another arbitrary group are photographed together, and numerically describing the frequency. Methods of expressing the relationship with other groups, in the form of a table, include the above examples, but are not limited to the same.

Also, the person information item 550 is an item expressing information of people belonging to a group, and can include information of one or more people. The person information item 550 may include an item (Person ID) 552, expressing the unique ID of the person, an item (Person name) 554, expressing the unique name of the person, an item (Person importance value) 556, expressing the degree of importance of the person, an item (Inter-person relationship table) 558, expressing any relationships with other people, in the form of a table, and an item (Parent group IDs) 559, expressing information of a parent group (a higher-level group) to which the person belongs, with an ID. Here, the item 556, expressing the degree of importance of the person, can be automatically measured by using information recording how frequently the user watches photos to which that person belongs, or can be set with an arbitrary value directly by the user, for example. Methods for determining the degree of importance of a person include the above examples, but are not limited to the same.

The item 558, expressing the relationship with other people, in the form of a table, may be an item expressing the relationship of two people, by storing the frequency of photos in which a person and another arbitrary person are photographed together, and numerically describing the frequency. Methods of expressing the relationship with other people, in the form of a table, may include the above example, but are not limited to the same.

Figure 6:
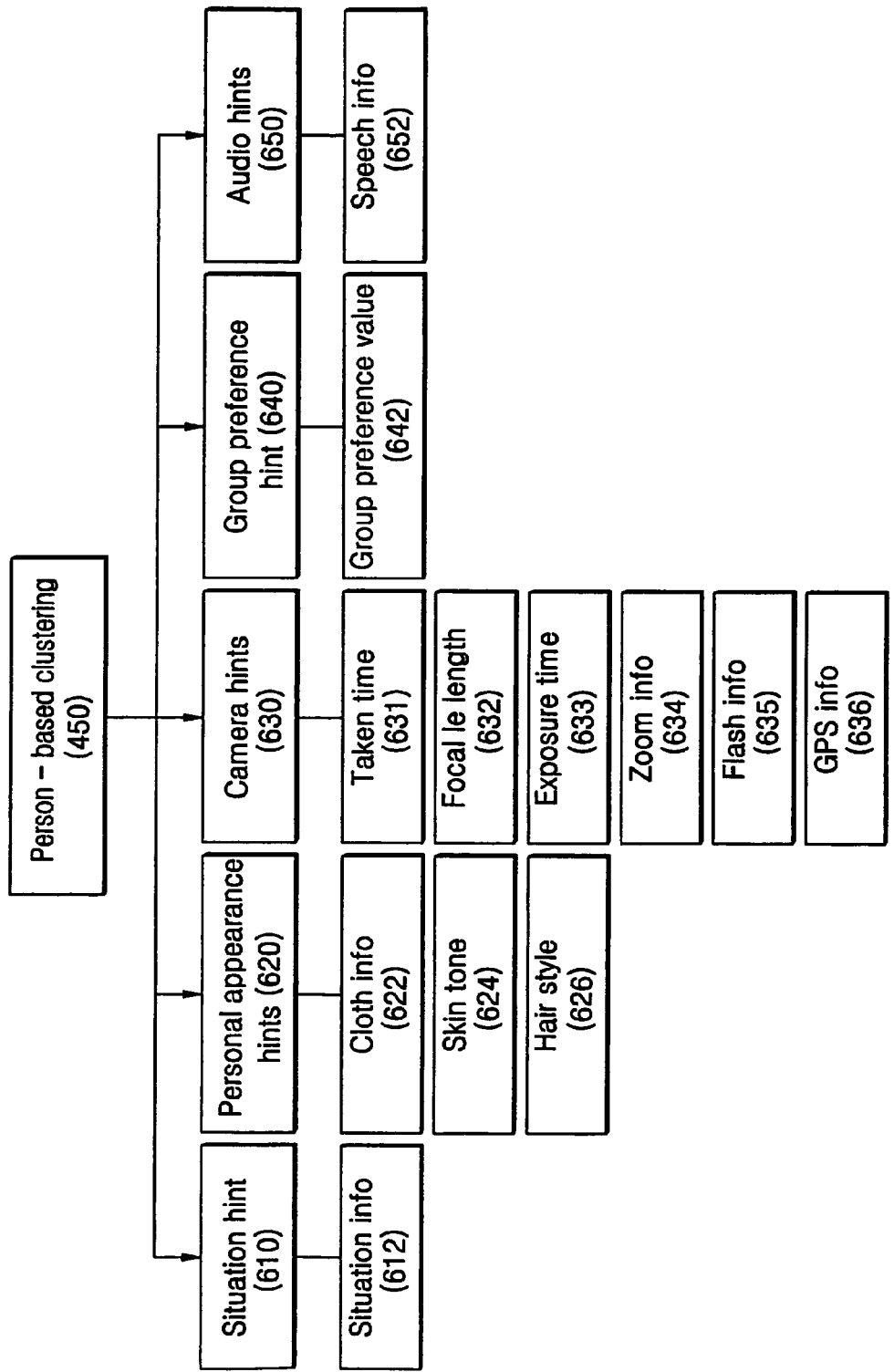
FIG. 6 is a block diagram showing a description scheme of person-based photo clustering hint items to improve a performance of person-based photo clustering, according to an embodiment of the present invention.

FIG. 6 is a block diagram showing the description scheme of the following person-based photo clustering hint items to improve the performance of person-based photo clustering. Referring to FIG. 6, the person-based clustering hit item (Person-based clustering hints) 450 may include an item (Situation hints) 610, expressing the result of situation-based clustering of photos, an item (Personal appearance hints) 620, expressing appearance feature information of a person, an item (Camera hints) 630, expressing camera information and photographing information stored in a photo file, an item (Group preference hint) 640, expressing information on a rough group list which is directly selected by the user and to which photos to be clustered belong, and an item (Audio hints) 650, expressing audio information stored together with a photo.

The item 610, expressing the result of situation-based clustering of photos, may include situation information 612 of a situation to which a photo belongs, as the result of situation-based clustering of photos, and may further include a unique ID.

The item 620, expressing appearance feature information of a person, may include an item (Cloth info) 622, expressing information on clothes that the person wears, an item (Skin tone) 624, expressing information on the skin tone of the person, and an item (Hair style) 626, expressing the hair style of the person. The item 620, expressing appearance feature information of a person, may include the above examples, but is not limited to the same.

The item 630, expressing camera information and photographing information stored in the photo file, may include an item (Taken time) 631, expressing information on the time when the photo was taken, an item (Focal length) 632, expressing information on the focal length when the photo was taken, an item (Exposure time) 633, expressing information on the exposure time when the photo was taken, an item (Zoom info) 634, expressing information on the camera zoom when the photo was taken, an item (Flash info) 635 expressing information on the flash when the photo was taken, and an item (GPS info) 636, expressing GPS information when the photo was taken.

The item 630, expressing camera information and photographing information stored in the photo file, may include the above examples, but is not limited to the same. The item 640, expressing information on a rough group list that is directly selected by the user, and to which photos to be clustered belong, may include an item (Group preference value) 642 numerically expressing groups selected by the user and the degrees of importance of the groups.

The item 650, expressing audio information stored together with a photo, may include an item (Speech info) 652, expressing speech information extracted from the audio information stored together with the photo data, and recognized keyword information. The item 650, expressing audio information stored together with a photo, may include the above example, but is not limited to the same.

Figure 7:
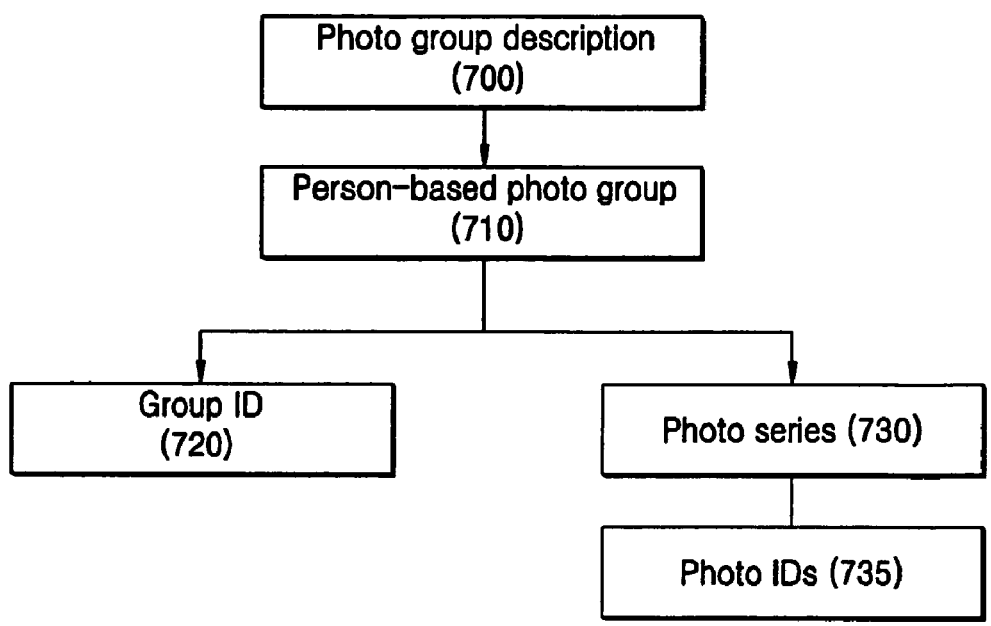
FIG. 7 is a block diagram showing a description scheme (photo group description) expressing photo group information after photos are person-based clustered, according to an embodiment of the present invention.

FIG. 7 is a block diagram showing a description scheme (photo group description) 700, expressing photo group information after photos are person-based clustered. The photo group may include a photo group (Person-based photo group) 710 by person-based photo clustering, and each cluster group may include a lower-level group (Photo series) 730. Each photo group can include a plurality of photos as photo IDs (Photo ID) 735. Each person-based cluster may include a group ID (Group ID) 720 and is referred to by a person-based group list.

Figure 8:
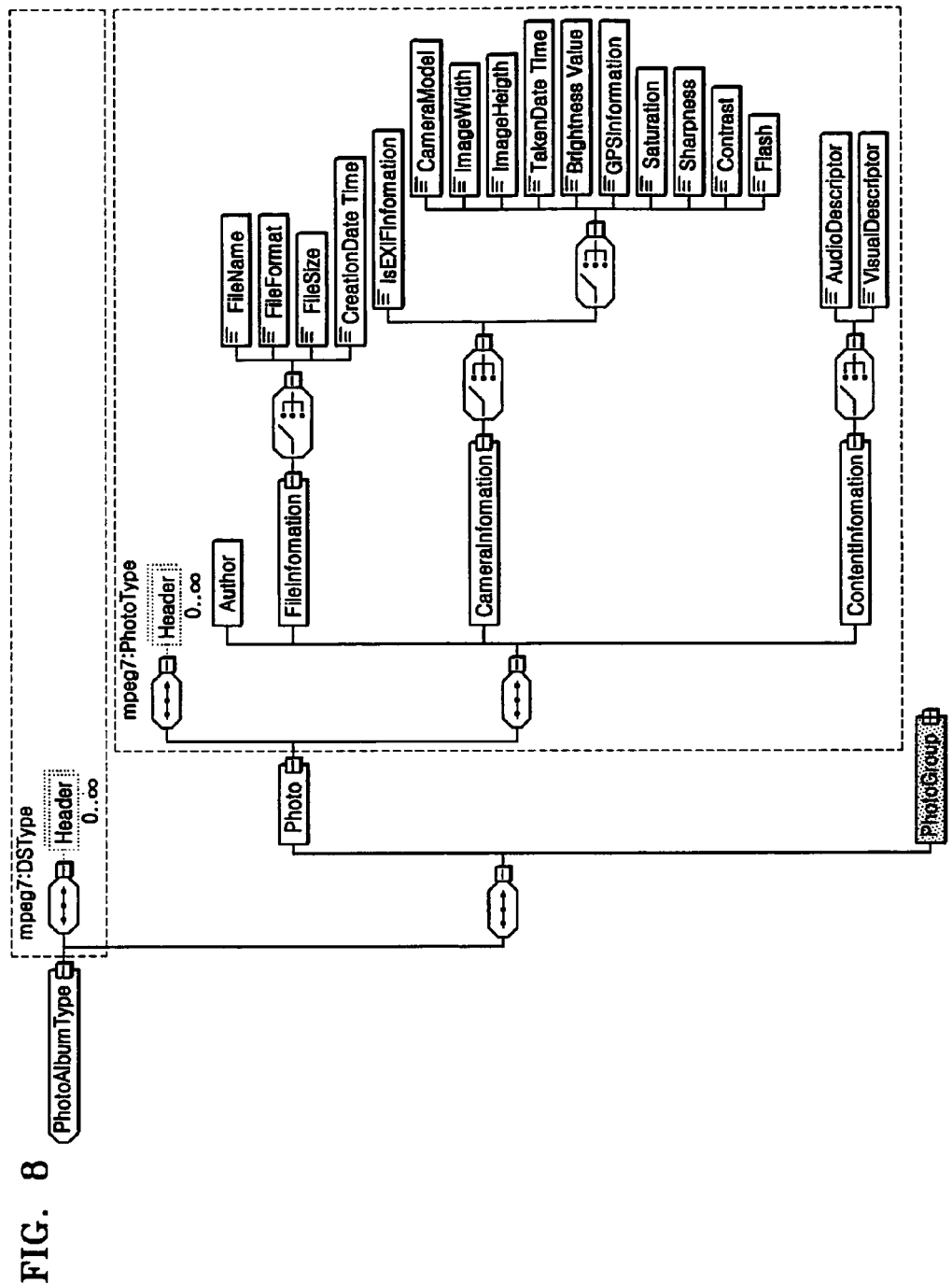
FIG. 8 is a block diagram of a photo information description scheme, according to an embodiment of the present invention, expressed as an XML schema.

FIG. 8 is a block diagram of a photo information description scheme, according to an embodiment of the present invention, expressed in an XML schema. As only an example, the description scheme expressing camera information and photographing information stored in a photo file and content-based feature value information extracted from the content of a photo can be expressed in an XML format as follows:

```
<complexType name="PhotoType">
  <complexContent>
    <extension base="mpeg7:DSType">
      <sequence>
        <element name="Author" type="mpeg7:TextualType"/>
        <element name="FileInfomation">
          <complexType>
            <complexContent>
              <extension base="mpeg7:DType">
                <sequence>
```

```
            <element name="FileName"
type="mpeg7:TextualType"/>
            <element name="FileFormat"
type="mpeg7:TextualType"/>
            <element name="FileSize"
type="nonNegativeInteger"/>
          <element name="CreationDateTime"
            type ="mpeg7:timePointType"/>
          </sequence>
        </extension>
      </complexContent>
    </complexType>
  </element>
  <element name="CameraInfomation">
    <complexType>
      <choice>
        <element name="IsEXIFInfomation"
type="boolean"/>
        <sequence>
          <element
name="CameraModel" type="mpeg7:TextualType"/>
          <element name="ImageWidth"
type="nonNegativeInteger"/>
          <element name="ImageHeight"
type="nonNegativeInteger"/>
          <element
name="TakenTime" type="mpeg7:timePointType"/>
          <element
name="BrightnessValue" type="integer"/>
          <element
name="GPSInfomation" type="mpeg7:timePointType"/>
          <element name="Saturation"
type="integer"/>
          <element name="Sharpness"
type="integer"/>
          <element name="Contrast"
type="integer"/>
          <element name="Flash"
type="boolean"/>
        </sequence>
      </choice>
    </complexType>
  </element>
  <element name="ContentBasedInfomation">
    <complexType>
      <complexContent>
        <extension base="mpeg7:DType">
          <sequence>
            <element
name="AudioDescriptor" type="mpeg7:AudioDType"/>
            <element
name="VisualDescriptor" type="mpeg7:VisualDType"/>
          </sequence>
        </extension>
      </complexContent>
    </complexType>
  </element>
</sequence>
<attribute name="PhotoID" type="ID" use="required"/>
</extension>
</complexContent>
</complexType>
```

Figure 9:
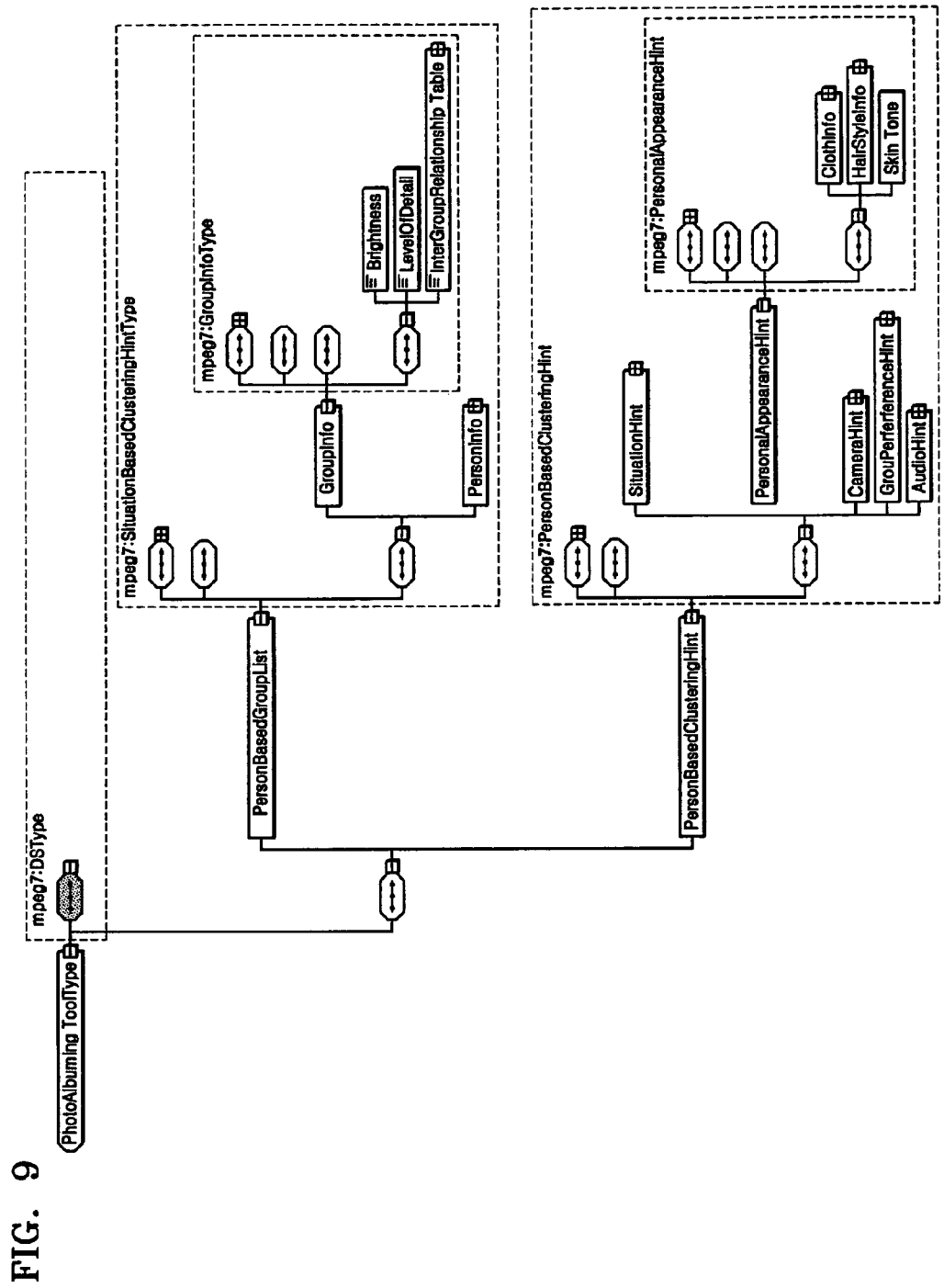
FIG. 9 is a block diagram of a parameter description scheme for photo albuming, according to an embodiment of the present invention, expressed as an XML schema.

FIG. 9 is a block diagram of a parameter description scheme for photo albuming, according to an embodiment of the present invention expressed as an XML schema. As only an example, the description scheme expressing parameters for person-based photo clustering can be expressed in an XML format, as follows:

```
<complexType name="PhotoAlbumingToolType">
  <complexContent>
    <extension base="mpeg7:DSType">
      <sequence>
        <element name="PersonBasedGroupList"
type="mpeg7:PersonBasedGroupListType"/>
        <element name="PersonBasedClusteringHint"
type="mpeg7:PersonBasedClusteringHintType"/>
      </sequence>
    </extension>
  </complexContent>
</complexType>
<complexType name="PersonBasedGroupListType">
  <complexContent>
    <extension base="mpeg7:PhotoAlbumingToolType">
      <sequence>
        <element name="GroupInfo" type="mpeg7:GroupInfoType"/>
        <element name="PersonInfo" type="mpeg7:PersonInfoType"/>
      </sequence>
    </extension>
  </complexContent>
</complexType>
<complexType name="PersonBasedClusteringHintType">
  <complexContent>
    <extension base="mpeg7:PhotoAlbumingToolType">
      <sequence>
        <element name="SituationHint"
type="mpeg7:SituationHintType"/>
        <element name="PersonalAppearanceHint"
type="mpeg7:PersonalAppearanceHintType"/>
        <element name="CameraHint"
          type="mpeg7:CameraHintType"/>
        <element name="GroupPerferenceHint"
type="mpeg7:GroupPerferenceHintType"/>
        <element name="AudioHint" type="mpeg7:AudioHintType"/>
      </sequence>
    </extension>
  </complexContent>
</complexType>
<complexType name="GroupPerferenceHintType">
  <complexContent>
    <extension base="mpeg7:PersonBasedClusteringHintType">
      <sequence>
        <element name="PreferenceValue"
          type="mpeg7:zeroToOneType"/>
      </sequence>
      <attribute name="GroupID" type="IDREF"/>
    </extension>
  </complexContent>
</complexType>
<complexType name="GroupInfoType">
  <complexContent>
    <extension base="mpeg7:PersonBasedGroupListType">
      <sequence>
        <element name="GroupName" type="mpeg7:TextualType"/>
    <element name="GroupImportanceValue"
      type="mpeg7:zeroToOneType"/>
        <element name="InterGroupRelationshipTable"
type="mpeg7:RelationshipTableType"/>
      </sequence>
      <attribute name="GroupID" type="IDREF" use="required"/>
      <attribute name="ParentGroupIDs" type="IDREF"
        use="required"/>
    </extension>
  </complexContent>
</complexType>
<complexType name="PersonInfoType">
  <complexContent>
    <extension base="mpeg7:PersonBasedGroupListType">
      <sequence>
        <element name="PersonName" type="mpeg7:TextualType"/>
    <element name="PersonImportanceValue"
      type="mpeg7:zeroToOneType"/>
        <element name="InterPersonRelationshipTable"
type="mpeg7:RelationshipTableType"/>
      </sequence>
      <attribute name="MemberID" type="IDREF" use="required"/>
      <attribute name="ParentGroupIDs" type="IDREF"
        use="required"/>
    </extension>
  </complexContent>
</complexType>
<complexType name="RelationshipTableType">
```

-continued

```
    <complexContent>
        <extension base="mpeg7:PersonBasedGroupListType">
            <sequence>
                <element name="RelationshipFactor"
                type="mpeg7:zeroToOneType"/>
            </sequence>
            <attribute name="SourceItem" type="IDREF" use="required"/>
            <attribute name="DestinationItem" type="IDREF"
            use="required"/>
        </extension>
    </complexContent>
</complexType>
<complexType name="PersonalAppearanceHintType">
    <complexContent>
        <extension base="mpeg7:PersonBasedClusteringHintType">
            <sequence>
                <element name="ClothInfo" type="mpeg7:VisualInfoType"/>
                <element name="HairStyleInfo"
                type="mpeg7:VisualInfoType"/>
                <element name="SkinTone" type="mpeg7:VisualDType"/>
            </sequence>
        </extension>
    </complexContent>
</complexType>
<complexType name="SituationHintType">
    <complexContent>
        <extension base="mpeg7:PersonBasedClusteringHintType">
            <sequence>
                <element name="SituationInfo" type="IDREF"/>
            </sequence>
        </extension>
    </complexContent>
</complexType>
<complexType name="AudioHintType">
    <complexContent>
        <extension base="mpeg7:PhotoAlbumingToolType">
            <sequence>
                <element name="RecognizedSpeech"
                type="mpeg7:TextualType"/>
            </sequence>
        </extension>
    </complexContent>
</complexType>
<complexType name="CameraHintType">
    <complexContent>
        <extension base="mpeg7:PhotoAlbumingToolType">
            <sequence>
                <element name="TakenTime" type="mpeg7:timePointType"/>
                <element name="ZoomInfo" type="mpeg7:zeroToOneType"/>
                <element name="FlashInfo" type="boolean"/>
                <element name="ExposureTime"
                type="mpeg7:timePointType"/>
                <element name="FocalLength"
                type="mpeg7:zeroToOneType"/>
                <element name="GPSInformation"
                type="mpeg7:timePointType"/>
            </sequence>
        </extension>
    </complexContent>
</complexType>
```

Figure 10:
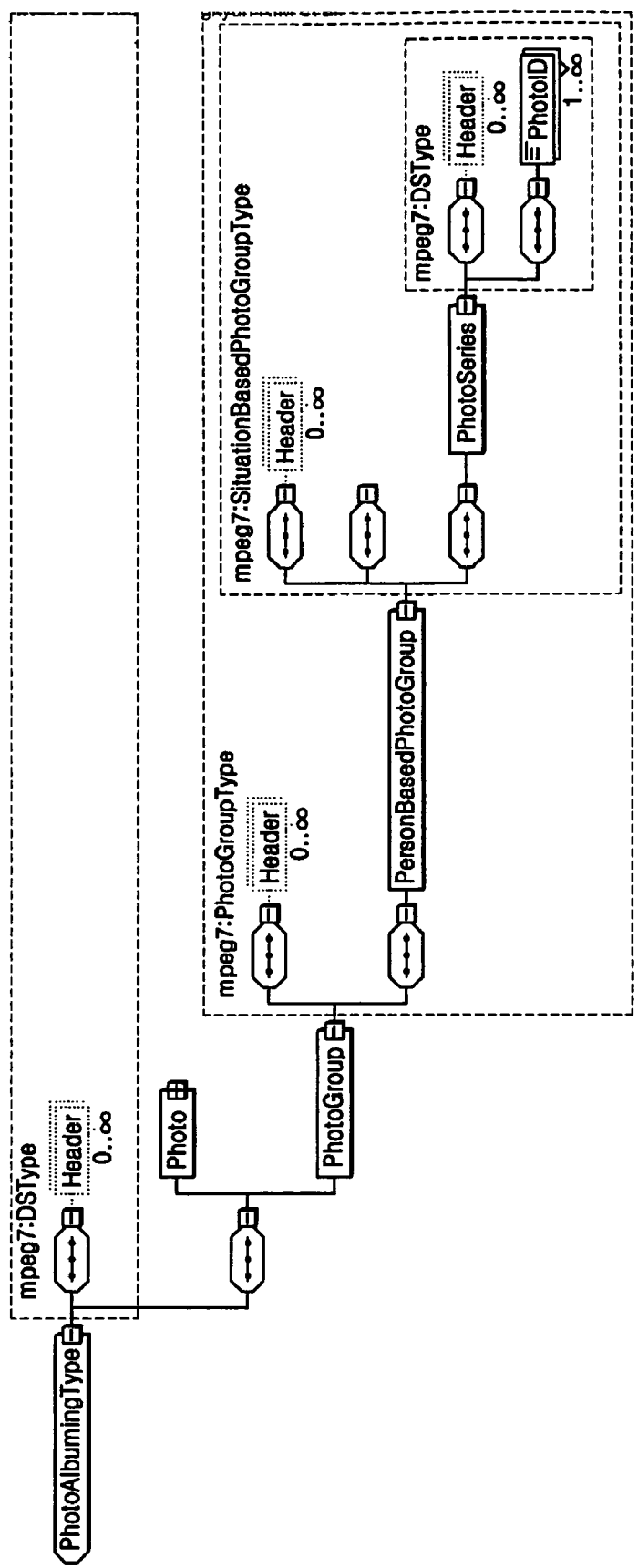
FIG. 10 is a block diagram of a photo group description scheme, according to an embodiment of the present invention, expressed as an XML schema.

FIG. 10 is a block diagram of a photo group description scheme, according to an embodiment of the present invention, expressed as an XML schema. As only an example, the description scheme expressing photo group information after photos are clustered can be expressed in an XML format, as follows:

```
<complexType name="PersonBasedPhotoGroupType">
    <complexContent>
        <extension base="mpeg7:PhotoGroupType">
            <sequence>
                <element name="PhotoSeries">
                    <complexType>
```

```
                        <complexContent>
                            <extension base="mpeg7:DSType">
                                <sequence>
                                    <element name="PhotoID"
        type="IDREF" maxOccurs="unbounded"/>
                                </sequence>
                            </extension>
                        </complexContent>
                    </complexType>
                </element>
            </sequence>
            <attribute name="GroupID" type="IDREF" use="required"/>
        </extension>
    </complexContent>
</complexType>
```

Figure 11:
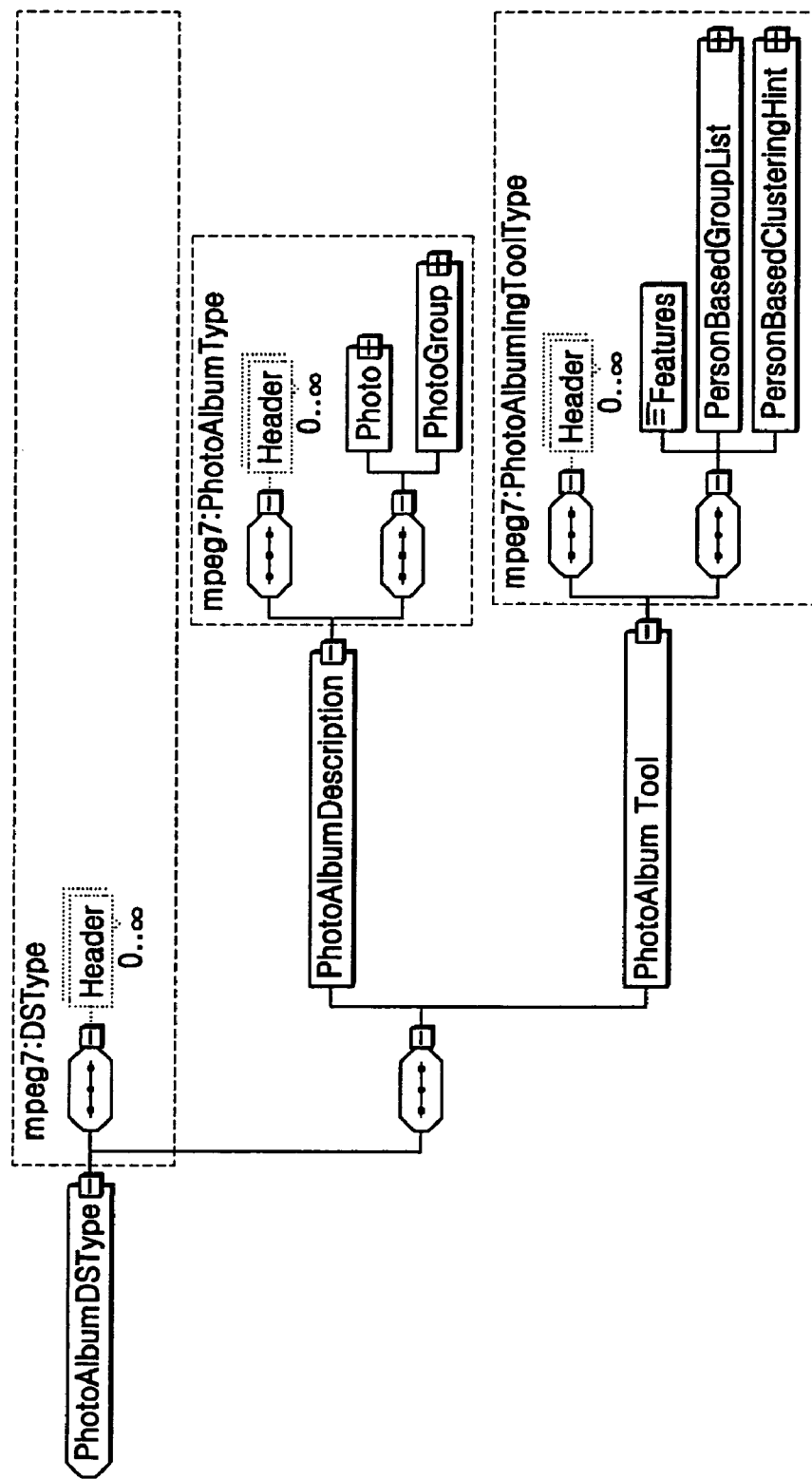
FIG. 11 is a block diagram of an entire description scheme for digital photo albuming using person-based photo clustering, according to an embodiment of the present invention, expressed as an XML schema.

FIG. 11 is a block diagram of an entire description scheme for digital photo albuming using person-based photo clustering, according to an embodiment of the present invention, expressed as an XML schema. As only an example, the entire description scheme for digital photo albuming can be expressed in an XML format, as follows:

```
<schema targetNamespace="urn:mpeg:mpeg7:schema:2001"
xmlns="http://www.w3.org/2001/XMLSchema"
xmlns:mpeg7="urn:mpeg:mpeg7:schema:2001"
elementFormDefault="qualified" attributeFormDefault="unqualified">
    <annotation>
        <documentation>
        This document contains visual tools defined in ISO/IEC 15938-3
        </documentation>
    </annotation>
    <include schemaLocation="./mds-2001.xsd"/>
    <complexType name="PhotoAlbumDSType">
        <complexContent>
            <extension base="mpeg7:DSType">
                <sequence>
                    <element name="PhotoAlbumDescription"
type="mpeg7:PhotoAlbumType"/>
                    <element name="AlbumingToolDescription"
type="mpeg7:PhotoAlbumingToolType"/>
                </sequence>
            </extension>
        </complexContent>
    </complexType>
    <complexType name="PhotoAlbumType">
        <complexContent>
            <extension base="mpeg7:DSType">
                <sequence>
                    <element name="Photo" type="mpeg7:PhotoType"/>
                    <element name="PhotoGroup"
                    type="mpeg7:PhotoGroupType"/>
                </sequence>
            </extension>
        </complexContent>
    </complexType>
</schema>
```

Figure 12:
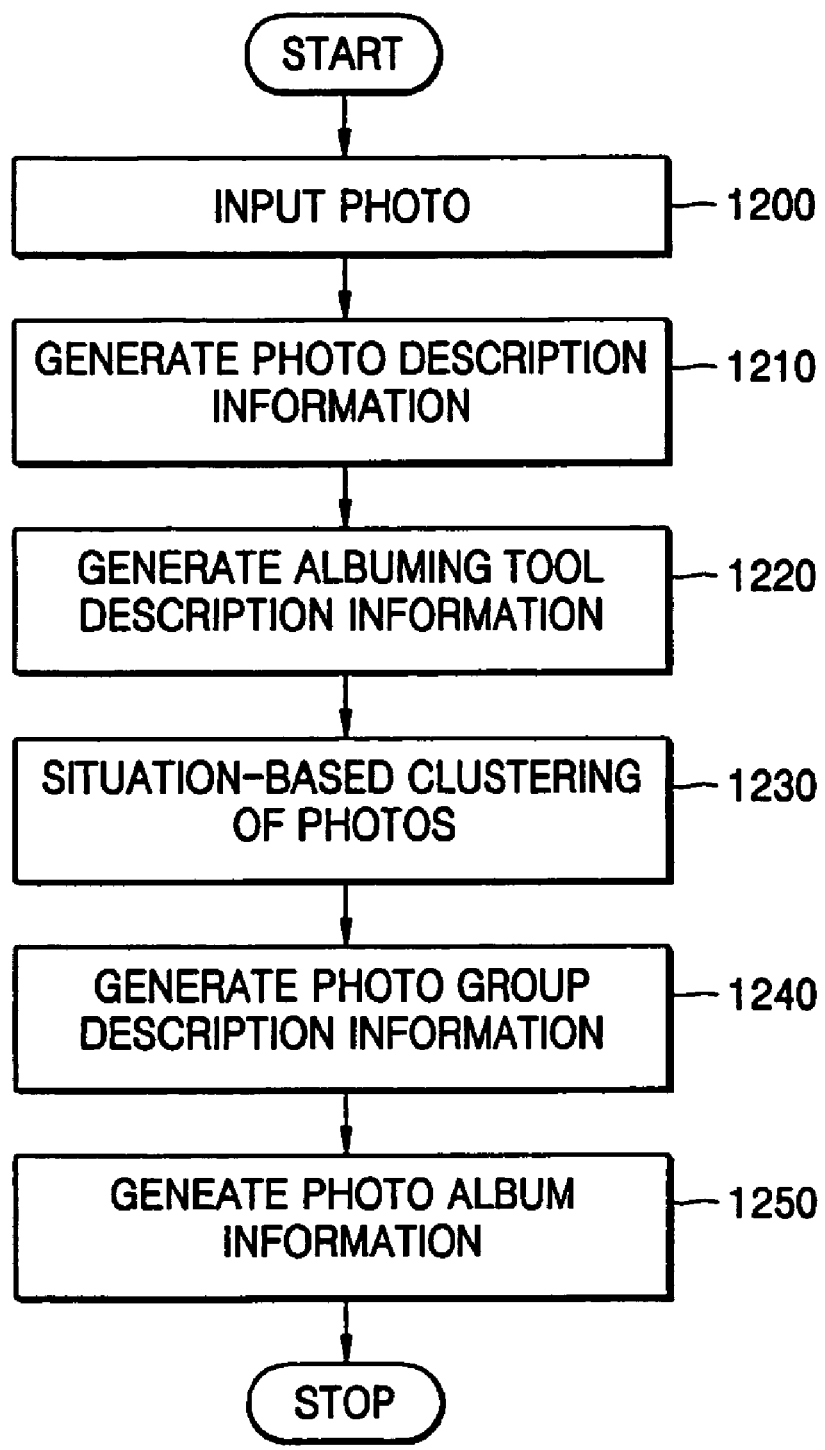
FIG. 12 is a flowchart of operations performed by a person-based digital photo album generation method, according to an embodiment of the present invention.

Meanwhile, FIG. 12 is a flowchart of the operations performed by a person-based digital photo album generation method, according to an embodiment of the present invention. The method of generating a person-based digital photo album, according to an embodiment of the present invention, and the operation of an apparatus therefore will now be further explained with reference to FIG. 12.

According to a person-based digital photo albuming apparatus and method, and according to an embodiment of the present invention, a digital photo album may be effectively generated with digital photo data by using the information described above. Accordingly, first, if a digital photo is input through a photo input unit 100, in operation 1200, photo description information describing the photo and including at least the photo ID may be generated, in operation 1210.

Also, albuming tool description information, including a predetermined parameter for digital photo clustering, may be generated by the albuming tool description information generation unit 120, in operation 1220. Then, the photo is person-based clustered by using the input photo, the photo description information, and the albuming tool description information, in operation 1230.

The person-based clustered result may be generated as predetermined photo group description information by the photo group information generation unit 140, in operation 1240. Predetermined photo album information may be generated in the photo album information generation unit 150, by using the photo description information and the photo group description information, in operation 1250.

Figure 13:
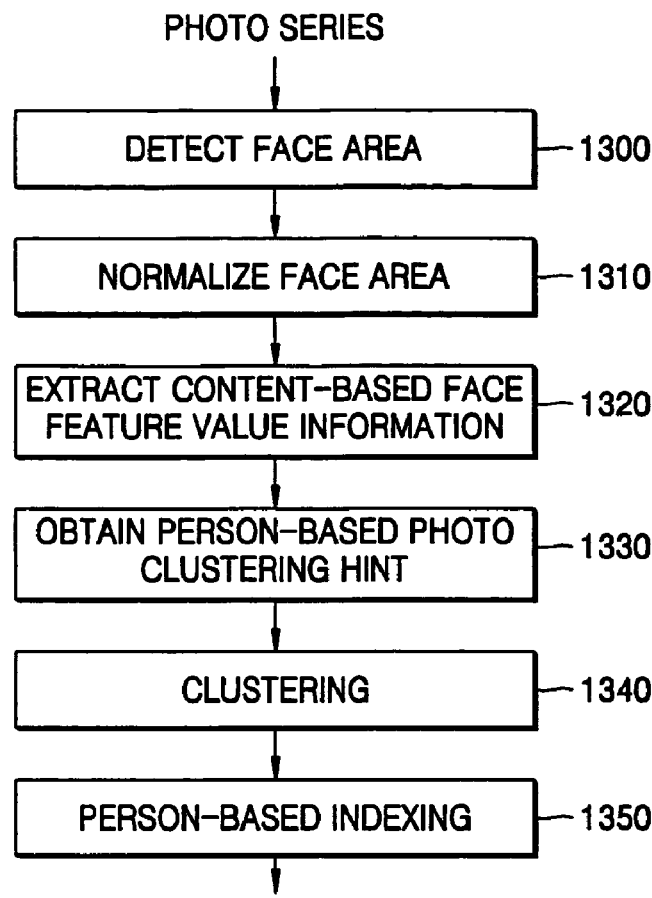
FIG. 13 is a detailed flowchart of an operation 1230 of FIG. 12, according to an embodiment of the present invention.

FIG. 13 is a detailed flowchart of the operation 1230. The operation of the person-based digital photo clustering apparatus for person-based clustering and a method thereof will now be further explained with reference to FIG. 13.

First, in order to cluster input photos, a face area may be detected from photo data by the face area detection unit 200, in operation 1300. When M face areas are extracted in an i-th photo among N input photos, $P_{face}(i)$ is pixel information of the extracted face area and can be expressed in the following equation 1:

$$P_{face}(i) = \{p_{face}(i,1), p_{face}(i,2), p_{face}(i,3), \ldots, p_{face}(i,m), \ldots, p_{face}(i,M-1), p_{face}(i,M)\} \quad (1)$$

Here, $p_{face}(i,m)$ denotes pixel information of an m-th face area extracted from an i-th photo. This face extraction process may be repeated in all the N input photos.

If the face areas are detected, since the size (resolution) of photo data can be different, the face area normalization unit 210 may normalize the size of all face areas into a size with a width of A and a length of B, in operation 1310.

$P_{norm}(i)$ is pixel information of the normalized face area and may be expressed as the following equation 2:

$$P_{norm}(i) = \{p_{norm}(i,1), p_{norm}(i,2), p_{norm}(i,3), \ldots, p_{norm}(i,m), \ldots, p_{norm}(i,M-1), p_{norm}(i,M)\} \quad (2)$$

Here, $p_{norm}(i,m)$ denotes pixel information of the normalized face area of an m-th face area extracted from an i-th photo. This face normalization process may be repeated in all the N input photos.

If the face areas are normalized, the face feature value extraction unit 220 may extract content-based face feature value information from the normalized face areas, in operation 1320. $F_{face}(i)$ is information on M content-based face feature values extracted from the i-th photo and may be expressed as the following equation 3:

$$F_{face}(i) = \{f_{face}(i,1), f_{face}(i,2), f_{face}(i,3), \ldots, f_{face}(i,m), \ldots, f_{face}(i,M-1), f_{face}(i,M)\} \quad (3)$$

Here, $f_{face}(i,m)$ denotes content-based feature value information of an m-th face area extracted from an i-th photo. For a method of extracting content-based face feature values, a Face Recognition descriptor of an MPEG-7 or Advanced Face Recognition descriptor may be used. Methods of extracting content-based face feature values include the above example, but are not limited to the same.

Also, the clustering hint obtaining unit 230 may extract person-based photo clustering hint information that is a parameter to improve the performance of person-based photo clustering, in operation 1330. The person-based photo clustering hint information may include a 'Personal appearance hint' indicating appearance feature information of a person, a 'Situation hint' indicating information on the clustered result based on situation information such as the place of a photo or the background, a 'Camera hint' indicating camera information, photographing information, and photo information included in a photo file, and an 'Audio hint' indicating audio information of the user stored together with a photo file.

$H_{hint}(i,m)$ is person-based photo clustering information of an m-th person extracted from an i-th photo and may be expressed as the following equation 4:

$$H_{hint}(i,m) = \{H_{personal\_appearance}(i,m), H_{camera}(i), H_{situation}(i), H_{audio}(i), \ldots\} \quad (4)$$

Here, $H_{personal\_appearance}(i,m)$ denotes the appearance feature information hint of an m-th person extracted from an i-th photo, $H_{camera}(i)$ denotes the camera information hint of the i-th photo, $H_{situation}(i)$ denotes the situation-based clustering hint information of the i-th photo, and $H_{audio}(i)$ denotes the audio hint information of the i-th photo. The person-based photo clustering information hint items include the above examples, but are not limited to the same.

Figure 14:
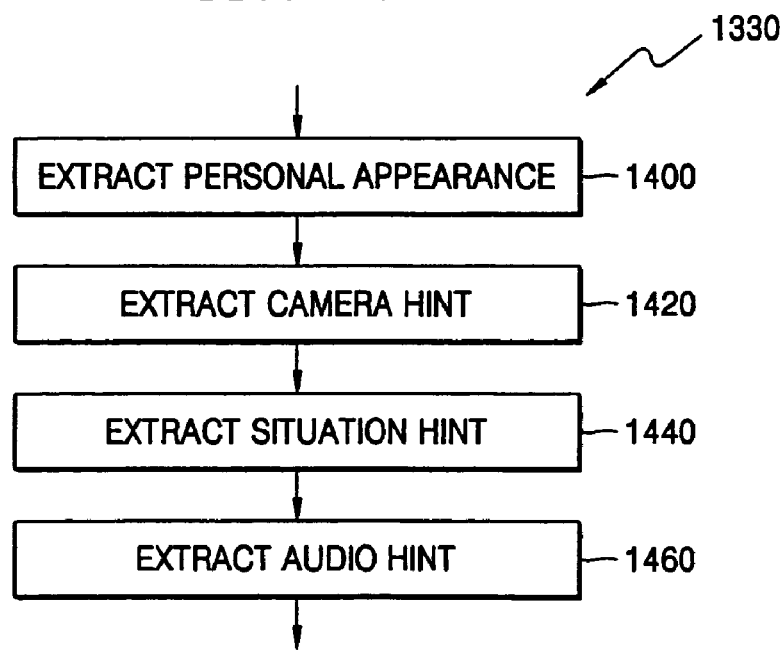
FIG. 14 is a detailed flowchart of an operation 1330 of FIG. 13, according to an embodiment of the present invention.

As shown in FIG. 14, the operation 1330 may include at least one of an operation 1400 for extracting a personal appearance hint, an operation 1420 for extracting a camera hint, an operation 1440 for extracting a situation hint, and an operation 1460 for extracting an audio hint, and the order of the operations can be changed with each other arbitrarily.

In the operation 1400, for extracting a personal appearance feature information hint item, $H_{personal\_appearance}(i,m)$ is a personal appearance feature information hint item that includes information items indicating clothes information, skin tone information and hair style of a person, for example, and may be expressed as the following equation 5:

$$H_{personal\_appearance}(i,m) = \{h_{cloth}(i,m), h_{skin\_tone}(i,m), h_{hair\_style}(i,m), \ldots\} \quad (5)$$

Here, $h_{cloth}(i,m)$ denotes clothes information of the person, $h_{skin\_tone}(i,m)$ denotes skin tone information of the person, and $h_{hair\_style}(i,m)$ denotes hair style information of the person. Items forming the appearance feature information hint of a person may include the above examples, but are not limited to the same.

In the operation 1420, for extracting camera information and photographing information hint items stored in a photo file, $H_{camera}(i)$ is the camera information and photographing information hint item stored in an i-th photo file and may include 'Taken time' that is an item expressing information on the time when the photo is taken, 'Focal length' that is an item expressing information on the focal length when the photo is taken, 'Exposure time' that is an item expressing information on the exposure time when the photo is taken, 'Zoom info' that is an item expressing information on the camera zoom when the photo is taken, 'Flash info' that is an item expressing information on the flash when the photo is taken, and 'GPS info' that is an item expressing GPS information when the photo is taken, and may be expressed as the following equation 8:

$$H_{camera}(i) = \{h_{take\_time}(i), h_{focal\_length}(i), h_{ex\_time}(i), h_{zoom}(i), h_{flash}(i), h_{gps}(i), \ldots\} \quad (6)$$

Here, $h_{taken\_time}(i)$ may denotes the time when the photo was taken, $h_{local\_length}(i)$ may denote information on the focal length when the photo was taken, $h_{ex\_time}(i)$ may denote exposure time information, $h_{zoom}(i)$ may denote camera zoom information, $h_{flash}(i)$ may denote flash information, and $h_{gps}(i)$ may denote GPS information. The camera information and photographing information hint items stored in a photo file may include the above examples, but are not limited to the same.

In the operation 1440, for extracting a situation-based clustering information hint item of a photo, $H_{situation}(i)$ is the situation-based clustering information hint item of an i-th photo, and may include 'Situation ID' that is an item expressing the unique ID of a situation to which the photo belongs, and may be expressed as the following equation 7:

$$H_{situation}(i) = \{h_{situation\_ID}(i), \ldots\} \quad (7)$$

Here, $h_{situation\_ID}(i)$ may denote the unique ID information of the situation to which the photo belongs. The situation-based clustering hint items of a photo may include the above example, but is not limited to the same.

In the operation 1460, for extracting an audio information hint item stored together with a photo, $H_{audio}(i)$ is the audio information hint item of an i-th photo, and may include 'Speech info' that is an item expressing speech information extracted from the audio information stored together with the photo data and recognized keyword information, and may be expressed as the following equation 6:

$$H_{audio}(i) = \{h_{speech}(i), \ldots\} \quad (8)$$

Here, $h_{speech}(i)$ may denote the speech information extracted from the audio information stored together with the photo data and recognized keyword information. The audio information hint items of a photo include the above example, but are not limited to the same.

Meanwhile, referring to FIG. 13, in the operation 1340 for clustering, before faces of input photos are indexed individually, clustering may bee performed first based on the situation in which a photo is taken. Then, in each situation-based cluster, person-based clustering may be performed. In the next operation, each clustered person-based cluster can be compared with person lists in the database and indexed.

Figure 15:
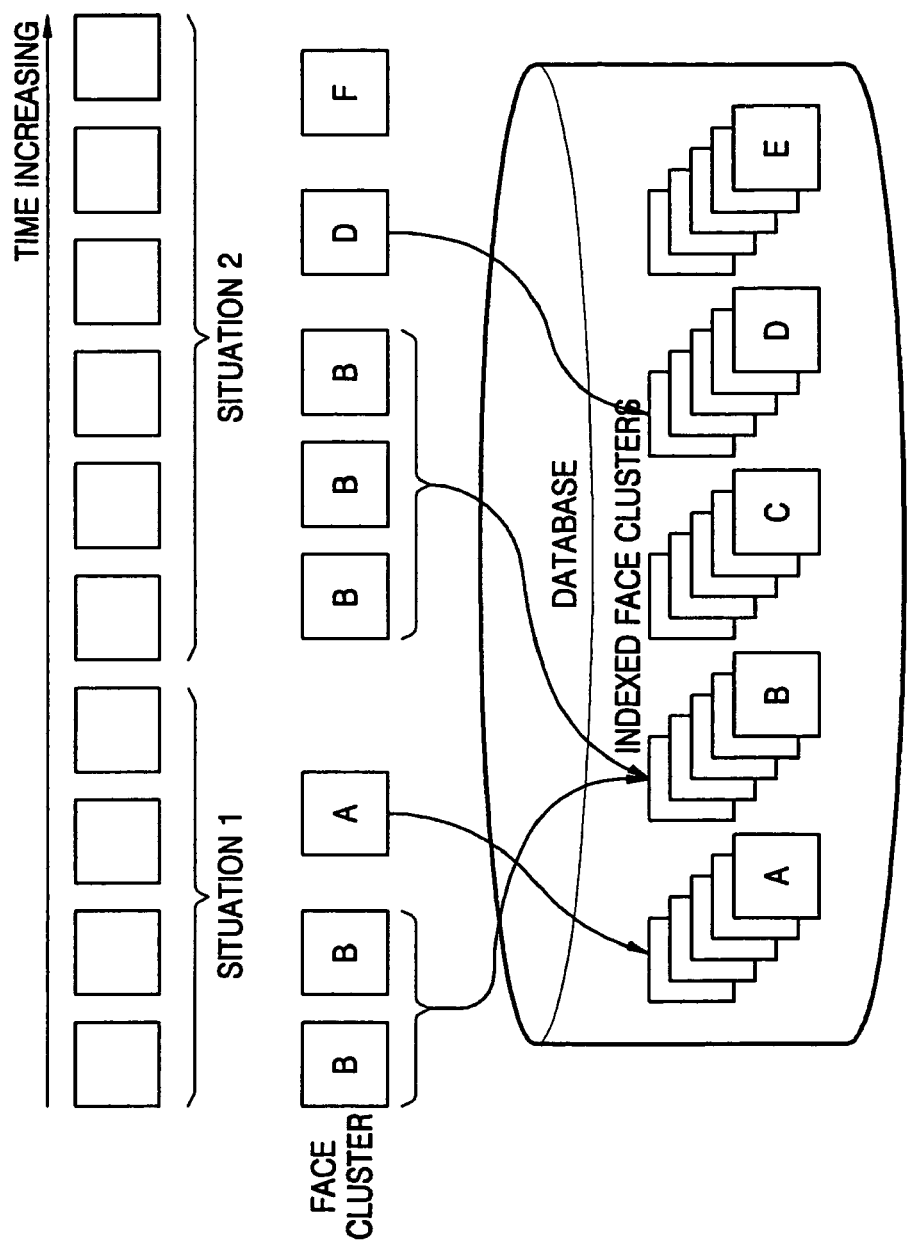
FIG. 15 is a flow diagram showing an example of a method by which photo data may be first situation-based clustered and then indexed, according to an embodiment of the present invention.

FIG. 15 is a flow diagram showing an example of a method by which photo data may be first situation-based clustered and then indexed. This is to enable use of a variety of additional information items as well as personal face information in the process for clustering photos by person.

For this, a new feature value may be generated, by applying the person-based clustering hint to extracted content-based face feature value information. $F_{combined}(i)$ may denote newly generated feature value information of an i-th photo in the following equation 9:

$$F_{combined}(i,m) = \Omega\{H_{hint}(i,m), F_{face}(i,m)\} \quad (9)$$

Here, function $\Omega(\cdot)$ is a function generating a new feature value, by using together $H_{hint}(i,m)$ that is the hint information of an m-th person of an i-th photo and $F_{face}(i,m)$ that is the content-based feature value information of the m-th person of the i-th photo.

As an example of generating a new feature value, first, photo data can be clustered based on situations, and person-based clustering can be performed for photos belonging to each situation.

In a given k-th situation cluster, a new feature value information generated by using together appearance feature information of a person, camera and/or photographing and/or photo information included in a photo file, the situation-based cluster information of the photo, and audio information of the user stored together with the photo file, may be expressed as the following equation 10. This is based on the fact that in photo data having identical situation information the appearance feature information items of an identical person may be similar to each other. If N input photos are clustered into K situations, function $\Omega(\cdot)$ may be defined in the following equation 10:

$$\Omega\{H_{hint}(i,m), F_{face}(i,m)\} = \{w_{personal\_appearance}(i,m) \cdot w_{camera}(i) \cdot w_{audio}(i) \cdot F_{face}(i,m)\}|_{situation(k)} \quad (10)$$

Here, $\{\cdot\}|_{situation(k)}$ may indicate clustering of photos first based on situation information such as the place of photographing or backgrounds, and situation(k) may denote a k-th situation cluster. Also, $w_{personal\_appearance}(i,m)$ may denote a weight obtained from $H_{personal\_appearance}(i,m)$ that is the appearance feature information of an m-th person of an i-th photo, and $w_{camera}(i)$ may denote a weight obtained from $H_{camera}(i)$ that is the camera and/or photographing information of the i-th photo. $w_{audio}(i)$ may denote a weight obtained from $H_{audio}(i)$ that is the audio information of the i-th photo.

As a result, if people belonging to the photo data, belonging to the k-th situation cluster situation(k), are clustered with a total of T persons, the person-based clustering result can be expressed as the following equation 11:

$$C(k)|_{situation(k)} = [C(k,1), C(k,2), C(k,3), \ldots, C(k,T)] \quad (11)$$

Here, $C(k,t)$ denotes a t-th person cluster belonging to the k-th situation interval situation(k). Each person cluster may include one or more person photos.

In the next operation, a feature value, representing the t-th person cluster belonging to the k-th situation cluster, may be generated. At this time, a method by which a representative person is selected among person photo data belonging to the person cluster, and the feature value of the representative person is used as the feature value representing the t-th person cluster can be used.

$$F_{person}(k,t) = F_{face}|_{(k,t)} \quad (12)$$

Here, $F_{person}(k,t)$ denotes a feature value representing the t-th person cluster belonging to the k-th situation cluster. Also, $F_{face}|_{(k,t)}$ denotes the person-based feature value of the representative person selected in the t-th person cluster belonging to the k-th situation cluster. Methods of generating a feature value representing a t-th person cluster may include the above example, but are not limited to the same.

Referring to FIG. 13, in a person-based indexing operation 1350, if person-based clustering for all K situation clusters is finished, an indexing operation for each person-based cluster may be performed next. Indexing of the person-based clusters may include an operation for comparing each person-based cluster with personal photos stored (already indexed) in a database, and storing with a closest index.

First, personal photos stored in a database are stored with a structure formed with information on each person and information on a group to which the person belongs. When a total of X person lists are in a database, an x-th person may be stored with person list information 1600. The person list information may be expressed in the following equation 13:

$$V_{person}(x) = \{v_{ID}(x), v_{name}(x), v_{importance}(x), v_{relation}(x), v_{parentIDs}(x)\} \quad (13)$$

Here, $v_{ID}(x)$ may denote the unique ID of the x-th person, $v_{name}(x)$ may denote the unique name of the person, $v_{importance}(x)$ may denote the degree of importance of the person, $v_{relation}(x)$ may denote information on the relationship with other persons, expressed in the form of a table, and $v_{parentIDs}(x)$ may denote the parent group (higher-level group) to which the person belongs.

Also, when a total of Y person group lists are in a database, a y-th person group may be stored with person group list information 1650. The person group list information may be expressed in the following equation 14:

$$V_{group}(y)=\{v_{ID}(y),v_{name}(y),v_{importance}(y),v_{relation}(y),v_{parentIDs}(y)\} \quad (14)$$

Here, $v_{ID}(y)$ may denote the unique ID of the y-th person group, $v_{name}(y)$ may denote the unique name of the person group, $v_{importance}(y)$ may denote the degree of importance of the person group, $v_{relation}(y)$ may denote information on the relationship with other person groups, expressed in the form of a table, and $v_{parentIDs}(y)$ may denote the parent group (higher-level group) to which the person group belongs.

Figure 16:
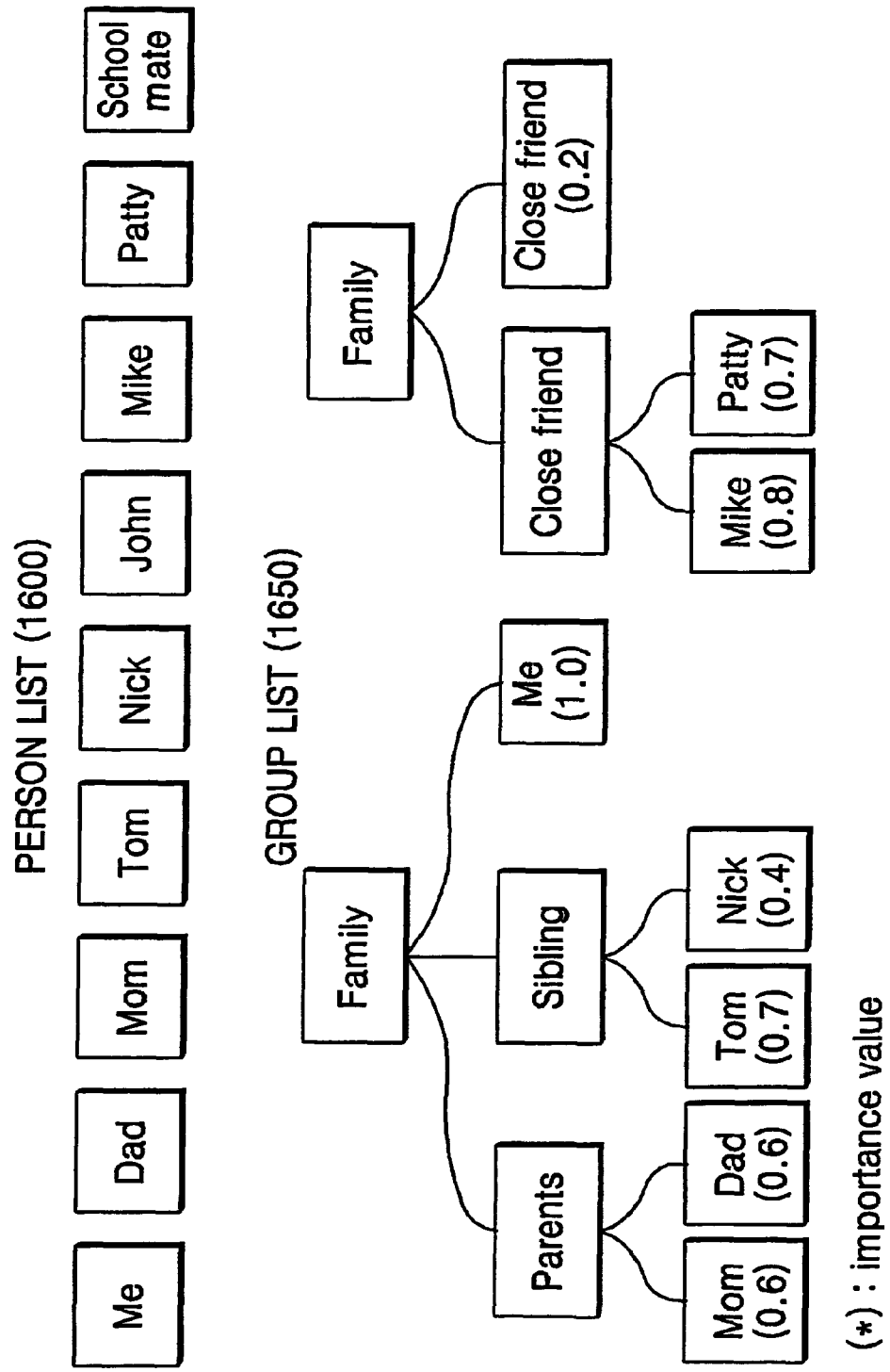
FIG. 16 illustrates an embodiment of a person list and a person group list stored in a database.

FIG. 16 illustrates an embodiment of a person list and a person group list stored in a database. In FIG. 16, the person group list may be formed with people of the given person list (e.g., 'Me', 'Dad', 'Mom', 'Tom', 'Nick', 'John', 'Mike', 'Patty', and 'School mate'), and each person list has an importance value ranging from 0.0 to 1.0.

FIG. 17 illustrates an embodiment of relations among people expressed in a table. For example, in case of user 'Me', the degree of relationship with 'John' is the highest, and this means that the frequency of photos in which 'Me' and 'John' are photographed together is the highest.

When a total of S personal photos are stored in a database, if an s-th personal photo belongs to an x-th person and to a y-th person group, $R_{DB}(s)|_{(x,y)}$ is the feature value information of the s-th person photo data and may be formed with face feature value information, person/group list information, and a person group preference hint specified by the user, and may be expressed as the following equation 15:

$$R_{DB}(s)|_{(x,y)}=[\{F_{face}(s)\},\{V_{person}(x),V_{group}(x)\},\{H_{group\_preference}(y)\}] \quad (15)$$

Here, $H_{group\_reference}(y)$ may denote the preference of a y-th person group by the user.

In order to index a t-th person cluster belonging to a k-th situation cluster, first, a similarity distance value may be measured, by comparing the feature value ($F_{person}(k,t)$) of the t-th person cluster, belonging to the k-th situation cluster, with feature value ($R_{DB}(s)|_{(x,y)}$) in the database. The similarity distance value between the feature value ($F_{person}(k,t)$) of the t-th person cluster, belonging to the k-th situation cluster, and the feature value of the s-th person in the database may be measured according to the following equation 16:

$$D(s)|_{(k,t)}=\Psi(F_{person}(k,t),R_{DB}(s)|_{(x,y)}) \quad (16)$$

Here, $\chi(\bullet)$ denotes a function measuring the similarity distance value between two feature values. As a result, the similarity distance value between the t-th person cluster belonging to the k-th situation cluster and the entire person data in the database may be expressed as the following equation 17:

$$D|_{(k,t)}=\{D(1)|_{(k,t)},D(2)|_{(k,t)},D(3)|_{(k,t)},\ldots,D(S)|_{(k,t)}\} \quad (17)$$

Finally, a person having a smallest similarity distance value, that is, having the largest similarity, is selected, and by allocating the unique ID of the person to the t-th person cluster belonging to the k-th situation cluster, the indexing is finished. The indexing may be expressed as the following equation 18:

$$V_{ID}|_{(k,t)} = \arg\min_{V_{ID}|_{(k,t)}}\{D(1)|_{(k,t)}, D(2)|_{(k,t)}, D(3)|_{(k,t)}, \ldots, D(S)|_{(k,t)}\} \quad (18)$$

Here, $v_{ID}|_{(k,t)}$ denotes a person index allocated to the t-th person cluster, belonging to the k-th situation cluster, and the person index may be in the form of a unique ID. If the person is not in the database, a new ID may be allocated.

Embodiments of the present invention can also be embodied as computer readable code in a medium, e.g., a computer readable recording medium. A computer may includes all apparatuses having an information processing function, for example. The medium may be any data storage device that can store/transfer data which can be thereafter read by a computer system. Examples of the computer readable recording medium/media may include read-only memory (ROM), random-access memory (RAM), CD-ROMs, magnetic tapes, floppy disks, and optical data storage devices.

Embodiments of the present invention include a person-based digital photo clustering method, medium, and apparatus, and a person-based digital photo albuming method, medium, and apparatus, shifting away from the face recognition methods used in conventional security systems. Photo data taken in the daily lives of users may be clustered, by person, such that an album can be effectively formed with a large volume of photo data. That is, person-based digital photo clustering can be effectively performed by using additional information including content-based feature information of face parts included in photo data, appearance feature information, such as the clothes color, hair style, skin tone of each person, and situation information such as a taken time, and backgrounds.

Furthermore, by using person-based clustered information, users can easily store, and/or retrieve a large volume of photo data in an album, and share clustered photos with other users. For this, by using together a description scheme for effectively describing information items that can be extracted from a photo, the face information of a photo, and a variety of additional information items (camera information, photographing information, situation information, clothes information, and the like), parameters for appropriately performing person-based clustering of photos are defined, and effective description schemes to described the parameters are explained. Also, by using together additional information items such as camera and/or photographing information included in a photo file, an album can be quickly and effectively generated with a large volume of photo data.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A person-based digital photo clustering method, comprising:
   detecting a face area from photo data;
   extracting content-based face feature value information from the detected face area;
   obtaining person-based photo clustering hint information; and
   performing, through controlling at least one processor, person-based clustering by applying the person-based photo clustering hint information to the extracted content-based face feature value information,
   wherein the performing of person-based clustering comprises:
   performing clustering based on a situation in which a photo is taken, based on the extracted content-based face feature value information, to obtain a situation-based cluster; and performing person-based clustering in the situation-based cluster, by applying the person-based photo clustering hint information to the extracted content-based face feature value information.

2. The method of claim 1, wherein
the detecting of the face area further comprises normalizing a size of the face area by using detected face area information, to generate a normalized face area, and
in the extracting of the content-based face feature value information, the content-based face feature value information is extracted from the normalized face area.

3. The method of claim 1,
wherein the extracting of the content-based face feature value information from the detected face area includes extracting content-based feature value information including at least one of:
an item expressing at least one of color, texture, and shape feature values extracted by using a visual descriptor of a moving picture experts group (MPEG)-7; and
an item expressing an audio feature value extracted by using an audio descriptor of the MPEG-7.

4. The method of claim 1, wherein the person-based photo clustering hint information further comprises at least one of:
a personal appearance hint indicating appearance feature information of a person;
a situation hint indicating information on a result of the clustering based on situation information including a place or background of a photo;
an audio hint indicating audio information of a user stored together with the photo file; and
a camera hint indicating at least one of camera information, photographing information, and photo information included in a photo file.

5. The method of claim 4, wherein the personal appearance hint comprises at least one of clothes information, skin tone information, and hair style information of the person.

6. The method of claim 4, wherein the situation hint comprises a situation ID expressing an identifier of a situation to which the photo is clustered.

7. The method of claim 4, wherein the camera hint comprises at least one of:
a taken time expressing information on a time when the photo was taken;
a focal length expressing information on a focal length when the photo was taken;
an exposure time expressing information on an exposure time when the photo was taken;
a zoom info expressing information on a camera zoom when the photo was taken;
a flash info expressing information on a flash when the photo was taken; and
a GPS info expressing global positioning system (GPS) information when the photo was taken.

8. The method of claim 4, wherein the audio hint comprises a speech info expressing speech information extracted from audio information stored together with photo data and recognized keyword information.

9. The method of claim 1 further comprising:
indexing each of multiple person-based clusters if person-based clustering is finished.

10. The method of claim 9, wherein in the indexing of each of the multiple person-based clusters, a person-based cluster is compared with predetermined indexed personal photos stored in a database and is stored according to a closest corresponding index.

11. The method of claim 9, wherein the predetermined indexed personal photos stored in the database have respective person information, and the person information is formed with person list information comprising at least one of an identifier of the person, the name of the person, importance of the person, relations of the person with other people in a group of the person, and information on a higher-level group to which the person belongs.

12. The method of claim 11, wherein the predetermined indexed personal photos stored in the database further comprise information on the group to which the person belong, and the information of the person is formed with person group list information comprising at least one of an identifier of the group, the name of the group, importance of the group, relations of the group with other person groups, and information on a higher-level group to which the group belongs.

13. A person-based digital photo clustering apparatus comprising:
a face area detection unit to detect a face area from photo data;
a face feature value extraction unit to extract content-based face feature value information from the detected face area;
a clustering hint information obtaining unit to obtain person-based photo clustering hint information; and
a clustering unit to perform person-based clustering by applying the person-based photo clustering hint information to the extracted content-based face feature value information,
wherein the clustering unit comprises:
a situation-based clustering unit to perform clustering based on a situation in which a photo is taken, based on the extracted content-based face feature value information, to obtain a situation-based cluster; and
a person-based clustering unit to perform person-based clustering in the situation-based cluster, by applying the person-based photo clustering hint information to the extracted content-based face feature value information.

14. The apparatus of claim 13, further comprising:
a face area normalization unit to normalize a size of the face area by using detected face area information to generate a normalized face area,
wherein the face feature value extraction unit extracts the content-based face feature value information from the normalized face area.

15. The apparatus of claim 13, wherein extracting of the content-based face feature value information includes extracting content-based feature value information including at least one of:
at least one of an item expressing color, texture, and shape feature values extracted by using a visual descriptor of an MPEG-7; and
an item expressing an audio feature value extracted by using an audio descriptor of the MPEG-7.

16. The apparatus of claim 13, wherein the person-based clustering hint information obtaining unit further comprises at least one of:
a personal appearance hint extraction unit extracting a personal appearance hint indicating appearance feature information of a person;
a situation hint extraction unit extracting a situation hint indicating information on a result of the clustering based on situation information including a place or background of a photo;
an audio hint extraction unit extracting an audio hint indicating audio information of a user stored together with the photo file; and a camera hint extraction unit extracting at least one of a camera hint indicating at least one of camera information, photographing information, and photo information included in a photo file.

17. The apparatus of claim 13, further comprising:
a person-based indexing unit to index each of multiple person-based clusters if person-based clustering is finished.

18. The apparatus of claim 17, further comprising:
a group preference hint obtaining unit to obtain a group preference value,
wherein by referring to the group preference value obtained by the group preference hint obtaining unit, the person-based indexing unit compares a person-based cluster with predetermined indexed personal photos stored in a database and stored according to a closest corresponding index.

19. The apparatus of claim 18, wherein the predetermined indexed personal photos stored in the database have respective person information, and information on a group to which other people and the person belong, and
the person information is formed with person list information comprising at least one of an identifier of the person, the name of the person, importance of the person, relations of the person with other people, and information on a higher-level group to which the person belongs,
and the person group information is formed with person group list information comprising at least one of an identifier of the group, the name of the group, importance of the group, relations of the group with other groups, and information on a higher-level group to which the group belongs.

20. A person-based digital photo albuming method, comprising:
generating photo description information including a photo identifier for identifying at least a photo;
generating albuming tool description information supporting person-based photo clustering and including at least a parameter for person-based photo clustering, wherein the parameter for person-based photo clustering at least includes a person-based photo clustering hint item for improvement of performance of person-based clustering;
performing, through controlling at least one processor, photo albuming including the person-based clustering by using at least the photo description information and the albuming tool description information, and wherein the performing of the photo albuming including person-based clustering comprises person-based clustering of digital photo data;
generating predetermined photo group description information from photo albumed data from the performing of the photo albuming; and
generating predetermined photo album information by using the photo description information and the predetermined photo group description information,
wherein the performing of person-based clustering comprises:
performing clustering based on a situation in which a photo is taken, based on the extracted content-based face feature value information, to obtain a situation-based cluster; and
performing person-based clustering in the situation-based cluster, by applying the person-based photo clustering hint item to the extracted content-based face feature value information.

21. The method of claim 20, further comprising:
receiving an input of photo data from an internal memory device of a digital camera or a portable memory device.

22. The method of claim 20, wherein in the generating of the photo description information, existence of EXIF information, such as camera information and photographing information, is confirmed in a photo file of an input photo, and if the EXIF information exists in the photo file, the EXIF information is extracted and expressed according to a predetermined photo description scheme.

23. The method of claim 22, wherein the photo description information comprises at least a photo identifier, information on a photographer having taken the photo, photo file information, camera information, photographing information and a content-based feature value, with the content-based feature value including at least one of a visual descriptor generated by using pixel information of the photo, including at least one of color, texture, and shape feature values, and an audio descriptor including a speech feature value.

24. The method of claim 20, wherein in the generating of the albuming tool description information, the parameter for person-based photo clustering further comprises:
a person-based group list item describing an indexed person-based group list.

25. The method of claim 24, wherein the person-based group list item comprises:
group list information indicating a list of groups after person-based clustering and indexing are performed; and
person list information indicating a list of persons after person-based clustering and indexing are performed.

26. The method of claim 25, wherein individual group information on each of multiple groups forming the group list information comprises at least one of an identifier of a group, a name of the group, importance of the group, relationships of the group, and an identifier of a higher-level group to which the group belongs.

27. The method of claim 26, wherein the importance of the group is determined by a frequency that a user watches photos included in the group or people in the group.

28. The method of claim 25, wherein individual person information forming the person list information comprises at least one of an identifier of the person, a name of the person, relationships of the person with other people, an importance of the person, and an identifier of an upper-level group to which the person belongs.

29. The method of claim 28, wherein the importance of the person is determined by a frequency that the user watches photos including the person.

30. The method of claim 24, wherein the person-based photo clustering hint item further comprises at least one of:
a personal appearance hint indicating appearance feature information of a person;
a situation hint indicating information on a result of the situation-clustering based on situation information including a place or background of the photo;
a group preference hint indicating information on a group list, selected by the user, which photos to be clustered belong,
an audio hint indicating audio information of a user stored together with the photo file; and
a camera hint indicating at least one of camera information, photographing information, and photo information included in a photo file.

31. The method of claim 30, wherein the situation hint comprises an identifier of a situation to which the photo belongs as the result of the situation-based clustering of the photo.

32. The method of claim 30, wherein the personal appearance hint comprises at least one of information on clothes worn by the person, skin tone information of the person, and hair style information of the person.

33. The method of claim 30, wherein the camera hint comprises at least one of information on a time when the photo was taken, information on a focal length when the photo was taken, information on an exposure time when the photo was taken, information on a camera zoom when the photo was taken, information on a flash when the photo was taken, and GPS information when the photo was taken.

34. The method of claim 30, wherein the group preference hint comprises a group preference value numerically expressing groups selected by the user and a degrees of importance of the groups.

35. The method of claim 30, wherein the audio hint comprises a speech info expressing speech information extracted from audio information stored together with the photo file and recognized keyword information.

36. The method of claim 20, wherein the person-based photo clustering comprises:
detecting a face area from photo data;
extracting the content-based face feature value information from the detected face area;
obtaining predetermined person-based photo clustering hint information as the person-based photo clustering hint item; and
performing person-based clustering by applying the predetermined person-based photo clustering hint information to the extracted content-based face feature value information.

37. The method of claim 36, wherein
the person-based photo clustering further comprises normalizing a size of the face area by using information of the detected face area, to generate a normalized face area, and
in the extracting of the content-based face feature value information, the content-based face feature value information is extracted from the normalized face area.

38. The method of claim 36, further comprising:
indexing each of multiple person-based clusters if person-based clustering is finished.

39. The method of claim 38, wherein in the indexing of each of the multiple person-based clusters, a person-based cluster is compared with predetermined indexed personal photos stored in a database and is stored with according to a closest corresponding index.

40. The method of claim 39, wherein the predetermined indexed personal photos stored in the database have respective person information, and the person information is formed with person list information comprising at least one of an identifier of the person, a name of the person, importance of the person, relations of the person with other people, and information on a higher-level group to which the person belongs.

41. The method of claim 40, wherein the predetermined indexed personal photos stored in the database further comprise information on a group to which the person and the other people belong, and the person group information is formed with person group list information comprising at least one of an identifier of the group, the name of the group, importance of the group, relationship of the group with other groups, and information on a higher-level group to which the group belongs.

42. A person-based digital photo albuming apparatus, comprising:
a photo description information generation unit to generate photo description information including a photo identifier for identifying at least a photo;
an albuming tool description information generation unit to generate albuming tool description information supporting person-based photo clustering and including at least a parameter for person-based photo clustering, wherein the parameter for person-based photo clustering of the albuming tool description information generation unit comprises a person-based photo clustering hint item for improvement of the performance of person-based clustering;
an albuming tool to perform photo albuming including the person-based clustering by using at least the photo description information and the albuming tool description information, wherein the albuming tool comprises a person-based photo clustering tool performing person-based clustering of digital photo data;
photo group information generation unit to generate predetermined photo group description information based on an output of the albuming tool; and
photo album information generation unit to generate predetermined photo album information by using the photo description information and the predetermined photo group description information,
wherein the albuming tool comprises:
a situation-based clustering unit to perform clustering based on a situation in which a photo is taken, based on extracted content-based face feature value information, to obtain a situation-based cluster; and
a person-based clustering unit to perform person-based clustering in the situation-based cluster, by applying the person-based photo clustering hint item to the extracted content-based face feature value information.

43. The apparatus of claim 42, further comprising:
a photo input unit to receive an input of photo data from an internal memory device of a digital camera or a portable memory device.

44. The apparatus of claim 42, wherein the photo description information generation unit confirms an existence of EXIF information, such as camera information and photographing information, in a photo file of an input photo, and if the EXIF information exists in the photo file, extracts the EXIF information and expresses according to a predetermined photo description scheme.

45. The apparatus of claim 44, wherein the photo description information comprises at least a photo identifier, information on a photographer having taken the photo, photo file information, camera information, photographing information and a content-based feature value, with the content-based feature value including at least one of a visual descriptor generated by using pixel information of the photo, including at least one of color, texture, and shape feature values, and an audio descriptor including a speech feature value.

46. The apparatus of claim 42, wherein the parameter for person-based photo clustering of the albuming tool description information generation unit further comprises:
a person-based group list item describing an indexed person-based group list.

47. The apparatus of claim 46, wherein the person-based group list item comprises:
group list information indicating a list of groups after person-based clustering and indexing are performed; and
person list information indicating a list of persons after person-based clustering and indexing are performed.

48. The apparatus of claim 47, wherein individual group information on each of multiple groups forming the group list information comprises at least one of an identifier of a group, a name of the group, importance of the group, relationships of the group, and an identifier of a higher-level group to which the group belongs.

49. The apparatus of claim 47, wherein individual person information forming the person list information comprises at least one of an identifier of the person, a name of the person, relationships of the person with other people, an importance of the person, and an identifier of an upper-level group to which the person belongs.

50. The apparatus of claim 46, wherein the person-based photo clustering hint item further comprises at least one of:
- a personal appearance hint indicating appearance feature information of a person;
- a situation hint indicating information on a result of the situation-clustering based on situation information including a place or background of the photo;
- a group preference hint indicating information on a group list, selected by the user, which photos to be clustered belong;
- an audio hint indicating audio information of a user stored together with the photo file; and
- a camera hint indicating at least one of camera information, photographing information, and photo information included in a photo file.

51. The apparatus of claim 42, wherein the person-based photo clustering tool comprises:
- a face area detection unit to detect a face area from photo data;
- a face feature value extraction unit to extract content-based face feature value information from the detected face area;
- a clustering hint information obtaining unit to obtain predetermined person-based photo clustering hint information as the person-based photo clustering hint item; and
- a clustering unit to perform person-based clustering by applying the predetermined person-based photo clustering hint information to the extracted content-based face feature value information.

52. The apparatus of claim 51, wherein the person-based photo clustering tool further comprises:
- a face area normalizing unit to normalize a size of the detected face area by using information of the detected face area, to generate a normalized face area, and
- the face feature value extraction unit to extract the content-based face feature value information from the normalized face area.

53. The apparatus of claim 52, further comprising:
- a person-based indexing unit to index each of multiple person-based clusters if person-based clustering is finished.

54. The apparatus of claim 53, wherein the person-based indexing unit further comprises:
- a group preference hint obtaining unit to obtain a group preference value, and
- by referring to the group preference value, obtained by the group preference hint obtaining unit, the person-based indexing unit compares a person-based cluster with predetermined indexed personal photos stored in a database and is stored according to a closest corresponding index.

55. The apparatus of claim 54, wherein the predetermined indexed personal photos stored in the database have respective person information, and information on a group to which the person and other people belong, and
- the person information is formed with person list information comprising at least one of an identifier of the person, a name of the person, importance of the person, relationships of the person with the other people, and information on a higher-level group to which the person belongs, and
- the person group information is formed with person group list information comprising at least one of an identifier of the group, a name of the group, importance of the group, relationships of the group with other groups, and information on a higher-level group to which the group belongs.

56. A computer readable recording medium comprising computer readable code to control at least one processor to implement the method of claim 1.

57. A computer readable recording medium comprising computer readable code to control at lest one processor to implement the method of claim 20.

58. The method of claim 1, further comprising:
- generating photo description information including a photo identifier for identifying at least a photo;
- generating albuming tool description information supporting the person-based clustering and including at least a parameter for the person-based clustering, wherein the parameter for the person-based clustering includes a person-based group list item, describing an indexed person-based group list, and the person-based photo clustering hint item for improvement of performance of person-based clustering;
- performing, using at least one processing device, photo albuming including the person-based clustering of digital photo data by using at least the photo description information and the albuming tool description information;
- generating predetermined photo group description information from photo albumed data from the performing of the photo albuming; and
- generating predetermined photo album information by using the photo description information and the predetermined photo group description information.

* * * * *